(12) United States Patent
Quintero et al.

(10) Patent No.: US 9,561,958 B2
(45) Date of Patent: Feb. 7, 2017

(54) ISOTHERMAL REACTOR FOR PARTIAL OXIDATION OF METHANE

(75) Inventors: Ruben Dario Rodriguez Quintero, Aberdeen (GB); Ernesto Manuel Santana Diaz, Aberdeen (GB); James Andrew Banister, Aberdeen (GB)

(73) Assignee: Gas2 Limited, Aberdeen (GB)

( * ) Notice: Subject to any disclaimer, the term of this patent is extended or adjusted under 35 U.S.C. 154(b) by 1149 days.

(21) Appl. No.: 13/261,355

(22) PCT Filed: Jan. 7, 2011

(86) PCT No.: PCT/GB2011/050015
§ 371 (c)(1),
(2), (4) Date: Sep. 14, 2012

(87) PCT Pub. No.: WO2011/083333
PCT Pub. Date: Jul. 14, 2011

(65) Prior Publication Data
US 2013/0015405 A1    Jan. 17, 2013

(30) Foreign Application Priority Data
Jan. 7, 2010 (GB) .................................. 1000156.8

(51) Int. Cl.
*C01B 3/36* (2006.01)
*B01J 8/00* (2006.01)
(Continued)

(52) U.S. Cl.
CPC ............ *C01B 3/382* (2013.01); *B01D 71/025* (2013.01); *B01J 8/009* (2013.01); *B01J 8/0214* (2013.01); *B01J 8/0257* (2013.01); *B01J 8/0278* (2013.01); *B01J 8/0285* (2013.01); *B01J 12/007* (2013.01); *C01B 3/386* (2013.01); *C01B 13/0251* (2013.01); *B01J 35/065* (2013.01);
(Continued)

(58) Field of Classification Search
None
See application file for complete search history.

(56) References Cited

U.S. PATENT DOCUMENTS 5,266,281 A † 11/1993 Kao
5,583,240 A † 12/1996 Asher
(Continued)

FOREIGN PATENT DOCUMENTS

EP    0962422 A1    12/1999
EP    2045212 A1    4/2000
WO   WO 03062141 A1    7/2003

OTHER PUBLICATIONS

EPO, International Search Report, pp. 1-3, Mar. 29, 2011.
(Continued)

*Primary Examiner* — Wayne Langel
(74) *Attorney, Agent, or Firm* — Wright IP & International Law; Eric G. Wright

(57) ABSTRACT

There is herein described a process and apparatus for partial oxidation of hydrocarbons. More particularly, there is described a process and an isothermal reactor apparatus for the partial oxidation of methane which comprises a heat transfer surface, a porous catalytic membrane and wherein heat is dissipated and/or removed through the heat transfer surface.

13 Claims, 15 Drawing Sheets

(51) Int. Cl.
*C01B 3/38* (2006.01)
*B01D 71/02* (2006.01)
*B01J 8/02* (2006.01)
*B01J 12/00* (2006.01)
*C01B 13/02* (2006.01)
*B01J 35/06* (2006.01)

(52) U.S. Cl.
CPC .............. *B01J 2208/00309* (2013.01); *B01J 2208/00849* (2013.01); *C01B 3/36* (2013.01); *C01B 2203/0216* (2013.01); *C01B 2203/0244* (2013.01); *C01B 2203/0261* (2013.01); *C01B 2203/0883* (2013.01); *C01B 2203/1035* (2013.01); *C01B 2203/1614* (2013.01)

(56) References Cited

U.S. PATENT DOCUMENTS

| | | | | |
|---|---|---|---|---|
| 5,637,259 A * | 6/1997 | Galuszka | ................ | B01J 8/009 252/373 |
| 5,714,091 A * | 2/1998 | Mazanec | ............. | B01D 53/228 252/373 |
| 5,846,641 A * | 12/1998 | Abeles | ................. | B01D 53/228 428/116 |
| 6,010,614 A | 1/2000 | Keskar et al. | | |
| 6,235,417 B1 * | 5/2001 | Wachsman | ........... | B01D 53/228 252/373 |
| 6,541,676 B1 * | 4/2003 | Franz | .................. | B01D 67/006 252/373 |
| 6,680,044 B1 * | 1/2004 | Tonkovich | ............ | B01J 12/007 252/373 |
| 6,977,064 B1 † | 12/2005 | Adris | | |
| 7,105,147 B2 * | 9/2006 | Kurimura | ........... | B01J 23/8946 252/373 |
| 7,622,086 B2 * | 11/2009 | Takahashi | ........... | B01D 53/229 422/211 |
| 7,641,888 B2 * | 1/2010 | Gobina | ................ | B01D 53/228 423/648.1 |
| 2006/0029539 A1 * | 2/2006 | Dutta | ...................... | B01J 8/009 423/651 |
| 2006/0127656 A1 * | 6/2006 | Gallo | ................... | B01D 53/228 428/212 |
| 2006/0275205 A1 * | 12/2006 | Krist | .................... | B01D 53/228 423/648.1 |
| 2008/0107593 A1 * | 5/2008 | Nakamura | ............. | B01D 53/22 423/648.1 |
| 2008/0169449 A1 * | 7/2008 | Mundschau | ......... | B01D 69/141 252/373 |
| 2008/0226544 A1 * | 9/2008 | Nakamura | ............. | B01J 8/0411 423/651 |
| 2008/0241058 A1 * | 10/2008 | Hattori | ................... | B01D 53/22 423/651 |
| 2010/0015014 A1 * | 1/2010 | Gopalan | ................ | B01D 69/12 422/187 |
| 2010/0047158 A1 * | 2/2010 | Borresen | .................. | C01B 3/16 423/648.1 |
| 2011/0240924 A1 * | 10/2011 | Repasky | ................. | B01J 12/007 252/373 |
| 2013/0043432 A1 * | 2/2013 | Repasky | ................. | B01J 12/007 252/373 |

OTHER PUBLICATIONS

Hwang S et al: "Heterogeneous catalytic reactor design with optimum temperature profile . . . "; Chem Eng. Science, Oxford, GB, vol. 59, No. 20 (Oct. 1, 2004).

International Preliminary Report on Patentability and Written Opinion of The International Searching Authority, WIPO, Jul. 10, 2012 (8 pages).

* cited by examiner
† cited by third party

ISOTHERMAL REACTOR FOR PARTIAL OXIDATION OF METHANE

FIELD OF THE INVENTION

The present invention relates to a process and apparatus for partial oxidation of hydrocarbons. More particularly, the present invention relates to a process and an isothermal reactor apparatus for the partial oxidation of methane which uses a heat transfer surface.

BACKGROUND OF THE INVENTION

There are three main technologies that are used for the production of syngas from methane and they are steam reforming, autothermal reforming and partial oxidation (catalytic and non-catalytic). The most commonly used are autothermal and steam reforming or a combination of the two. Both these technologies require a large proportion of steam to be included with the methane feed to prevent coke formation and reforming catalyst deactivation. In order to achieve high energy efficiency the large amount of sensible and latent heat contained within the steam must be recovered and recycled to the process.

Non-catalytic partial oxidation does not require the high levels of steam but the very high process temperatures (>1200 deg C.) create energy efficiency challenges of their own.

One more recent, non-commercial technology is the catalytic partial oxidation of methane using rhodium catalysts. Rhodium has been found to be highly selective in the oxidation with minimal coke formation allowing the partial oxidation process to be run at much lower temperatures. The process doesn't require steam to operate, although small quantities (10 vol % of the methane feed) are frequently described as a means of increasing the hydrogen to carbon monoxide ratio in the resultant syngas.

The simplicity of the system, with little or no steam, a lower temperature of operation and a highly active catalyst promises a compact and efficient process that is capable of operating efficiently without extensive steam recycles. However, the processes described in the literature prior to U.S. Pat. No. 7,641,888 Gobina, utilise a pre-mixed feed well within the explosive limits of the gases to produce a selective reaction. U.S. Pat. No. 7,641,888 is incorporated herein by reference. This presents significant safety problems particularly in operation and preheating of the respective feeds. The safety of the reaction relies on the gas velocities being maintained at a sufficiently high speed that flash back to the inlet point does not occur.

With the invention of a two chamber reactor separated by a porous, catalytic, membrane with mixing and reaction taking place simultaneously within the reactor the safety of the system was greatly improved.

However, there is another problem that is found within a fixed bed partial oxidation reactor that is described in the literature but not referred to in U.S. Pat. No. 7,641,888. That is the problem of catalyst overheating. It has since been found that a similar problem can also occur within the two chamber porous membrane reactor described. The steps to mitigate this problem within a multitubular reactor are the subject of this patent.

The partial oxidation of methane is a very rapid reaction that takes place at temperatures in excess of 600 deg C. Typically, when performed using a fixed bed of catalyst with a pre-mixed feed comprising methane and oxygen (gas molar ratio of 2:1) the feed is preheated to at least 400 deg C. such that good selectivity to carbon monoxide is achieved. The temperature of the gases passing over the catalyst rapidly rises and under adiabatic conditions (no heat loss) the product gases leaving the reactor can be in excess of 900 deg C. It is also beneficial if the reaction can be performed at elevated pressure since most of the processes that utilise syngas to form another chemical do so at raised pressure and the costs of compressing the component feed streams (comprising methane and oxygen) is less than compressing the resultant syngas. This is principally as a result of the increase in gas volumes that accompany the reaction. The partial oxidation of methane as described in U.S. Pat. No. 7,641,888 is found to have similar characteristics in that it is most beneficially carried out at elevated temperature and pressure.

The drawback of performing the partial oxidation reaction in a simple adiabatic reactor is that there is no control on the temperature of the fluids within the reactor and so there is less flexibility to operate the reactor at a temperature that is most beneficial for maintaining a long catalyst life. With a typical long contact time reactor this is a straightforward problem to solve by an engineer skilled in the art. Placing the catalyst pellets within the tube of a shell and tube type reactor or using a tube cooled reactors are both possibilities. A further possibility useful in lower temperature reactor is to operate the reaction in the liquid phase where the heat capacity of the liquid is able to absorb the heat of reaction.

Where a reaction such as the partial oxidation of methane requires a short contact time at high temperature, typically using a very shallow catalyst bed of pellets or gauze, then the removal of heat is more problematic. Unusual solutions can be found such as in the silver catalysed methanol to formaldehyde reactor where good thermal contact between enlarged, sintered catalyst pellets allows conduction of the heat of reaction to the front of the bed, which then acts as a feed pre-heater producing an essentially isothermal catalyst bed within an adiabatic reactor.

In the operation of a fixed bed catalyst with pre-mixed feed for the oxidation of methane to syngas there are safety issues that are associated with operating in an explosive regime. These problems are exacerbated if heat exchange function is required within the reactor. Some have sought to counteract this by stage wise addition of oxygen to the feed methane requiring a complex series of fixed beds and gas distributors (as described in Conoco U.S. Pat. No. 7,261,751 which is incorporated herein by reference) and this allows for removal of some of the reaction heat between catalyst beds as the material contains little or no oxygen as it passes through the heat exchanger. However, this is a complex and expensive solution.

A problem, found with rhodium partial oxidation catalysts in a fixed bed arrangement, is that despite the high selectivity that is achievable with this form of catalyst very high catalyst surface temperatures can form that far exceed the adiabatic reaction temperature.

One option to reduce the catalyst surface temperatures within the reactor is to operate the catalyst with a turbulent gas in contact with the catalyst. This is the subject of the present invention.

The slow partial oxidation of methane with oxygen is known to be a strongly exothermic reaction followed by an endothermic reaction. After this initial discovery it was discovered that the reaction would still take place at very much higher gas hourly space velocities (GHSV). The fast partial oxidation of methane with oxygen using a fixed bed of rhodium on alumina was thought to be effectively isothermal, although there is still some debate on this. Published work has shown that the reaction pathway still involves high heat release in the initial part of the catalyst bed and endothermic reactions later (e.g. Basini, Aasberg-Petersen, Guarinoni, Ostberg, Catalysis Today 64 (2001), 9-20, which is incorporated herein by reference). Some have attributed this rise in surface temperature to the superadiabatic effect that is related to the higher diffusion rates of $H_2$ and H in combustion processes, others have suggested it is a consequence of competing kinetics. However, a satisfactory way of managing the heat profile of the catalyst bed has not been found.

We also refer to WO 2004/098750, which is incorporated herein by reference, which relates to a membrane and a method of preparing the membrane, said membrane being used in a process to produce hydrogen gas via a partial oxidation of methane.

It is an object of at least one aspect of the present invention to obviate or mitigate at least one or more of the aforementioned problems.

It is a further object of at least one aspect of the present invention to provide an improved process and apparatus for partial oxidation of methane.

It is a further object of at least one aspect of the present invention to provide an improved process and apparatus for partial oxidation of methane which enables catalyst in the reaction zone to be cooled and thereby overcome the problem of a reaction catalyst overheating.

It is a yet further object of at least one aspect of the present invention to provide an improved process and apparatus for partial oxidation of methane which allows higher temperatures to be used which increases the thermal efficiency of the process and which also allows higher pressures of operation.

SUMMARY OF THE INVENTION

According to a first aspect of the present invention there is provided apparatus for the oxidation of reactant gases, said apparatus comprising:

a first chamber forming a passageway for a first reactant gas;

a second chamber forming a passageway for a second reactant gas;

a porous catalytic membrane separating the first and second chambers, said membrane being capable of allowing the first reactant gas to permeate from the first chamber through to the second chamber and the second reactant gas to diffuse into the porous catalytic membrane such that there is reaction and products pass into the second chamber;

wherein the heat of reaction formed from the reaction of the first and second reactant gases is capable of being dissipated and/or removed along the reaction zone.

According to a second aspect of the present invention there is provided apparatus for the oxidation of reactant gases, said apparatus comprising:

a first chamber forming a passageway for a first reactant gas;

a second chamber forming a passageway for a second reactant gas;

a porous catalytic membrane separating the first and second chambers, said membrane being capable of allowing the first reactant gas to permeate from the first chamber through to the second chamber and the second reactant gas to diffuse into the porous catalytic membrane such that there is reaction and products pass into the second chamber;

wherein the heat of reaction formed from the reaction of the first and second reactant gases is capable of being dissipated and/or removed along the reaction zone by passage of the gas along the heat transfer surface substantially perpendicular to the flow of gases through the porous catalytic zone.

According to a third aspect of the present invention there is provided apparatus for the oxidation of reactant gases, said apparatus comprising:

a first chamber forming a passageway for a first reactant gas;

a second chamber forming a passageway for a second reactant gas;

a porous catalytic membrane separating the first and second chambers, said membrane being capable of allowing the first reactant gas to permeate from the first chamber through to the second chamber and the second reactant gas to diffuse into the porous catalytic membrane such that there is reaction and products pass into the second chamber;

wherein the heat of reaction formed from the reaction of the first and second reactant gases is capable of being dissipated and/or removed along the reaction zone by passage of the gas along the heat transfer surface substantially perpendicular to the flow of gases through the porous catalytic zone, where the heat transfer surface is separated by than 5 mm the porous catalytic zone.

The present invention therefore relates to dissipating and/or removing thermal energy formed from the heat of reaction from the first and second reactant gases and reducing surface temperatures in the reaction zone. The first and second reactant gases may react together with one another in a partial oxidation to form a partially oxidised product such as a synthetic gas (e.g. CO and $H_2$).

Utilising a cylindrical geometry rather than fixed bed increases the surface area of catalyst bed that can be exposed to a heat transfer, particularly by the mechanism of thermal radiation in a cost effective manner. The heat of reaction can then be removed by providing a heat transfer surface within, for example, line of sight of this catalyst zone such that thermal radiation, and convection, from the reaction zone is capable of transferring some of the heat of reaction from the catalyst surface to the heat transfer surface. The heat transfer surface may be maintained at the desired temperature through the use of flowing gas across, for example, the reverse side. The catalytic porous zone is maintained at a more uniform temperature by ensuring a good thermal conductivity. This can be achieved, for example by the use of a sintered support whereby sintering of the component particles enhances thermal conductivity as a result of intimate contact between the constituent particles. One possibility is that this flowing gas may be one of the feed gases. This has the benefit of simplicity in that the heat transfer surface is not a pressure containing surface. For example, literature shows that while the temperature of the gas typically rises from about 400° C. to about 850° C., inlet to outlet for the stoichiometric reaction in a fixed bed, it may be found that surface catalyst temperatures reach up to about 1100° C. We have found that utilisation of a heat transfer surface in line of sight of the reaction zone for the partial oxidation of methane is able to lower the peak surface catalyst temperature by about 50-300° C. or typically about 100° C.

The amount of heat that can be removed depends upon the flow rate, exothermicity of the reaction and resultant surface temperatures. At a surface temperature of about 1000° C. the thermal radiation given off is approximately 60 kW/m². The amount that can be removed at this temperature without severe detrimental effect to the selectivity of the process depends strongly on the operating parameters including the amount of complete oxidation, the flow rates, the pressure etc. The upper limit is set by the amount of surface area and temperature and hence it can be seen that making more surface area visible is advantageous for heat transfer. In particular embodiments, the heat of reaction may be removed by coupling the apparatus to an endothermic reaction such as steam reforming of methane. An additional option may be that the heat transfer surface may be in the form of a tube, either surrounding the cylindrical catalyst support or placed between cylindrical support in an array, typical of shell and tube type heat exchanger units. In both these arrangements the heat transfer surface can form a pressure containing vessel that may now utilise a separate fluid to maintain the desired surface temperature of the heat transfer surface. Furthermore, the heat transfer tube may even contain catalyst and reacting fluids. For example, if the heat transfer tube contains a steam reforming catalyst and suitable reacting gases then, as steam reforming is a strongly endothermic reaction, some of the heat of reaction from the partial oxidation of methane will be transferred by convection and radiation to drive the steam reforming of methane. Preferably, the reaction zone in the second chamber where the first and second reactant gases may react may be directly connected to an endothermic reaction. The endothermic reaction preferably may have a heat of reaction in the region of 200 kJ/mol.

The reaction zone in the second chamber where the first and second reactant gases may react may also be directly connected to an exothermic reaction to deal with the situation when the oxidation reaction becomes endothermic. The exothermic reaction preferably may have a free energy reaction $\Delta H$ from about 40 to 900 kJ/mol depending on the level of complete and partial oxidation.

Heat may therefore be dissipated and/or removed from the reaction zone in the second chamber to the first chamber at a rate of about 0-50 kW/m$^2$ or typically about 20 kW/m$^2$. The temperature in the reaction zone may reach an upper surface temperature of about 1000° C. and a lower temperature of about 750° C. It is preferred to maintain the reaction zone at a temperature of about 950° C. by using externally connected exothermic and/or endothermic reactions.

The reaction zone may be defined as any part of or all of the area of the second chamber where reaction is occurring between the first and second reactant gases. The reaction zone may have a length of about 200 cm, may be at a temperature of about 900° C. with higher temperatures near to the feed inlet points and lower temperatures near the product outlet point and/or may have an operating pressure of about 100-2000 kPa. The diameter of the cylinder forming the chamber may be in the region of 40 mm. At higher turbulent flow within the second chamber the temperature profile is more even and the peak surface temperatures can occur more than half way through the reactor however the heat transfer surface is still able to effectively lower the catalytic surface temperatures.

The first and second reactant gases may be pre-heated in the region of the reaction zone in the apparatus.

The flow rate of the first and second reactant gases may be about 600 lpmin.

Typically, the first chamber may be in the form of a sleeve which may be cylindrical in shape.

The first chamber may therefore have a central passageway through which the first reactant gas may flow along. The first chamber may also form a reaction chamber in which the first and second reactant gases may react.

Typically, the second chamber may be in the form of a sleeve which may be cylindrical in shape. The second chamber may have a larger diameter than the first chamber and may therefore form an outer sleeve. Typically, the second chamber may form an enclosure around or at least partially encompass the first chamber. The second chamber may therefore form a passageway for a second reactant gas.

The first reactant gas may permeate from the first chamber through the porous catalytic membrane at high temperatures into the second chamber to react with the second reactant gas. The rate of permeation of the first reactant gas may be such that the pressure drop from one chamber to another is maintained at a suitable level, typically less than about 1 bar. The pressure drop can be reduced by increasing the pores size of the support. Typically this pore size may be in the region of about 200 to 20,000 nm with the thickness of the layer being adjusted to balance the pressure drop and permeation rate.

Conveniently, the first reactant gas may therefore be predominantly fed via the first chamber and the second reactant gas may be predominantly fed via the second chamber.

The first reactant gas fed at a rate of about 300 lpmin and may, for example, be oxygen.

Typically, the first reactant gas may be pre-heated to a temperature of about 200° C. using any suitable type of pre-heater.

The first reactant gas may be fed into the first chamber using any suitable means such as an inlet.

The porous catalytic membrane may form a porous sleeve-type region containing a catalyst. The porous sleeve-type region may be of any suitable shape and may comprise a hollow core forming a passageway for the second reactant gas. For example, the sleeve-type region may be cylindrical or substantially cylindrical in shape.

The second reactant gas may be fed at a rate of about 600 lpmin and may, for example, be methane. The second reactant gas may also be pre-heated to a temperature of about 600° C. using any suitable type of pre-heater. In particular embodiments, a heat exchange surface may be used.

The first and second reactant gases may react to form a synthetic gas (i.e. syngas) giving a total outlet flow rate of about 1800 lpmin In particular embodiments where the first reactant gas is oxygen and the second reactant gas is methane the following partial oxidation reaction may occur to form synthetic gas:

$$CH_4 + 0.5O_2 \rightarrow CO + 2H_2$$

The porous catalytic membrane may be made from any suitable porous material but particularly is made from alumina and has pore sizes of about 0.2 to 20 μm. The porous catalytic membrane may therefore form a porous support in, for example, a cylindrical form. The porous catalytic membrane may comprise structured voids (i.e. not packed with catalyst pellets). A preferred catalytic material is rhodium or platinum. The catalyst may be impregnated throughout the whole of the porous region or may be deposited on either one of or both of the inner and outer surfaces of the porous region.

The function of the porous catalytic membrane may be to allow the first reactant gas once entering the first chamber to permeate towards the second reactant chamber and the second reactant gas to diffuse into the porous catalytic membrane whereupon they react. The presence of the catalytic metal within the zone where the gases mix may enable the correct stoichiometry at the catalyst surface for good selectivity to be maintained while also maintain separation of the reactant gases as they enter the reactor.

The pressure in the central passageway in the second chamber may be about 500 kPa. The pressure in the first chamber may be about 550 kPa.

Using heat exchange to maintain a heat transfer surface temperature from 800 to 1000° C. may modify the catalyst surface temperature. By modifying the catalyst surface temperature will maintain a more even catalyst surface temperature of about 900° C. This has the advantageous features of increasing catalyst life. The thermal efficiency of the process may also increased because heat can be used internally within the reactor for pre-heating of the feed gases to a higher temperature than with just simple preheating.

The temperature may be maintained by using a combination of exothermic and/or endothermic reactions in a heat transfer process to maintain the catalyst at an optimum operating temperature of, for example, about 900° C. The present invention therefore provides a heat exchange transfer surface capable of allowing heat to be removed from the catalytic surface where the exothermic reaction is most intense and optionally heat to be added to the reaction where the endothermic reactions become more dominant. Heat may therefore be dissipated by use of an endothermic reaction such as steam reforming of methane. In alternative embodiments, heat may be added by use of an exothermic reaction such as complete or partial combustion.

It is also beneficial for the length of the membrane, the diameter of the channels within the membrane and the diameter of the surrounding heat transfer surface to be chosen such that the Reynolds number of the fluid flow within the chamber containing the methane reactant gas is greater than 500.

The first chamber may therefore have a length and diameter such that the Reynolds number of the first reactant gas passing along the length of the first chamber has a Reynolds number greater than about 500. The Reynolds number in the first chamber may be selected from any of the following: greater than about 1,000; greater than about 5,000; or greater than about 10,000. Alternatively, the Reynolds number in the first chamber may be from about 500-20,000 or about 1,000 to 20,000.

To obtain the required Reynolds number the length of the first chamber may be selected from any of the following: longer than about 400 mm; longer than about 600 mm; longer than about 1,200 mm; longer than about 2,000 mm; or longer than about 5,000 mm.

To obtain the required Reynolds number the hydraulic mean diameter of the first chamber may be selected from any of the following: greater than about 2 mm; greater than about 5 mm; greater than about 10 mm; or greater than about 20 mm.

To obtain the required Reynolds number the hydraulic mean diameter of the first chamber may be selected from any of the following: less than about 300 mm; less than about 100 mm; or less than about 50 mm.

Typically, the oxygen may be fed to the reactor through a porous zone that is separate from the porous catalyst containing zone where:
  a. The Reynolds number in the chamber comprising oxygen is maintained lower than in the channel comprising methane
  b. Where the oxygen porous distributor is open ended.

In particular embodiments, a fraction of the gas is allowed to pass from one chamber to another without passage through the catalytic membrane.

The reactor may be refractory lined. Therefore, a shell of the reactor may have an internal refractory material capable of self containing heat giving the reactor adiabatic features that will allow the recovery of heat after passing through the reactor. The energy from the hot gases can then be used to generate energy or pre heat gases at the beginning.

Typically, the reaction may use air or any combination of oxygen enriched air.

The reactor may also allow for cleaning in situ by means of Introduction of, for example, steam to improve gas inlet velocity, decrease carbon formation and improve hydrogen yields.

The reactor may also allow introduction of nitrogen to enhance reactor performance and reduce the requirement for heat transfer.

The reactor may also allow gas product extraction on both sides of the membrane, in other words the adiabatic reactor enables recovery of the syngas produced through the middle of the reactor on the membrane side or through the shell of the adiabatic reactor.

The reactor may also allow for in situ regeneration of catalyst.

The reactor may be used for producing syngas in ratios of about 2:1 $H_2$/CO all the way to about 6:1 if desired.

The reactor may therefore be used for handling; Natural gas, Coal Bed Methane and Biogas.

According to a fourth aspect of the present invention there is provided a method of dissipating and/or removing heat along a reaction zone of an apparatus used for the oxidation of reactant gases, said method comprising:

providing a first chamber forming a passageway for a first reactant gas;

providing a second chamber forming a passageway for a second reactant gas;

providing a porous catalytic membrane separating the first and second chambers, said membrane being capable of allowing the first reactant gas to permeate from the first chamber through to the second chamber and the second reactant gas to diffuse into the porous catalytic membrane such that there is reaction and products pass into the second chamber;

wherein the heat of reaction formed from the reaction of the first and second reactant gases is capable of being dissipated and/or removed along the reaction zone.

The method may use any of the above described apparatus.

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of a process and apparatus for the production of synthetic gas for use in Fischer-Tropsch gas-to-liquids (GTL) production in the oil and gas exploration industry, for methanol production or for producing hydrogen for use as a fuel. In particular, the present invention resides in the provision of a porous membrane sleeve for the partial oxidation of methane which uses a heat transfer surface located next to the porous membrane to increase thermal efficiency. The heat transfer surface is used to dissipate and/or remove thermal energy formed from the heat of reaction and thereby reduce and/or control the temperature of the catalyst.

Whilst offshore oil production has risen slightly in recent years, natural gas (which mainly consists of methane) production has seen a marked increase. Natural gas is often extracted during the extraction of liquid hydrocarbons, such as oil, from the ground and is often undesirable due to the lack of infrastructure to transport the natural gas to an onshore location. The lack of infrastructure can be explained by the physical nature of natural gas which makes it difficult to transport safely and/or efficiently in its basic gaseous state. As a result the natural gas is often flared (ignited) causing economic waste and environmental concern. It would therefore be desirable to either convert the natural gas into some other substance which can be transported easily, or transport the natural gas in a liquid state. In this way, new field development will be more financially viable through the use of the extensive infrastructure and technology already in place in the offshore industry for transporting liquid hydrocarbons.

It is known to transport natural gas as a Liquid Natural Gas (LNG) in specifically constructed containers onboard vessels which have been adapted for such purposes. However, this has many disadvantages including; the need for expensive pressurising equipment which is difficult to scale down to suit smaller production fields, loss of gas during transportation ("boil-off"), danger posed in transit to vessel and crew by high pressure, highly flammable gases and the requirement to depressurise the LNG into a usable gaseous state at the customer end.

It is considered that a better way of utilising offshore produced natural gas ($CH_4$) is to convert it, on or in close proximity to the offshore production platform, into synthetic gas (i.e. syngas) which can in turn be used to produce gases, fluids and chemicals such as methanol, ammonia and importantly, crude oil that can be readily pumped through the same pipelines as the produced oil.

Syngas comprises a mixture of carbon monoxide (CO) and hydrogen ($H_2$). By way of background information, conversion of syngas to liquid hydrocarbon is a chain growth reaction between carbon monoxide and hydrogen on the surface of a heterogeneous catalyst.

Figure 1:
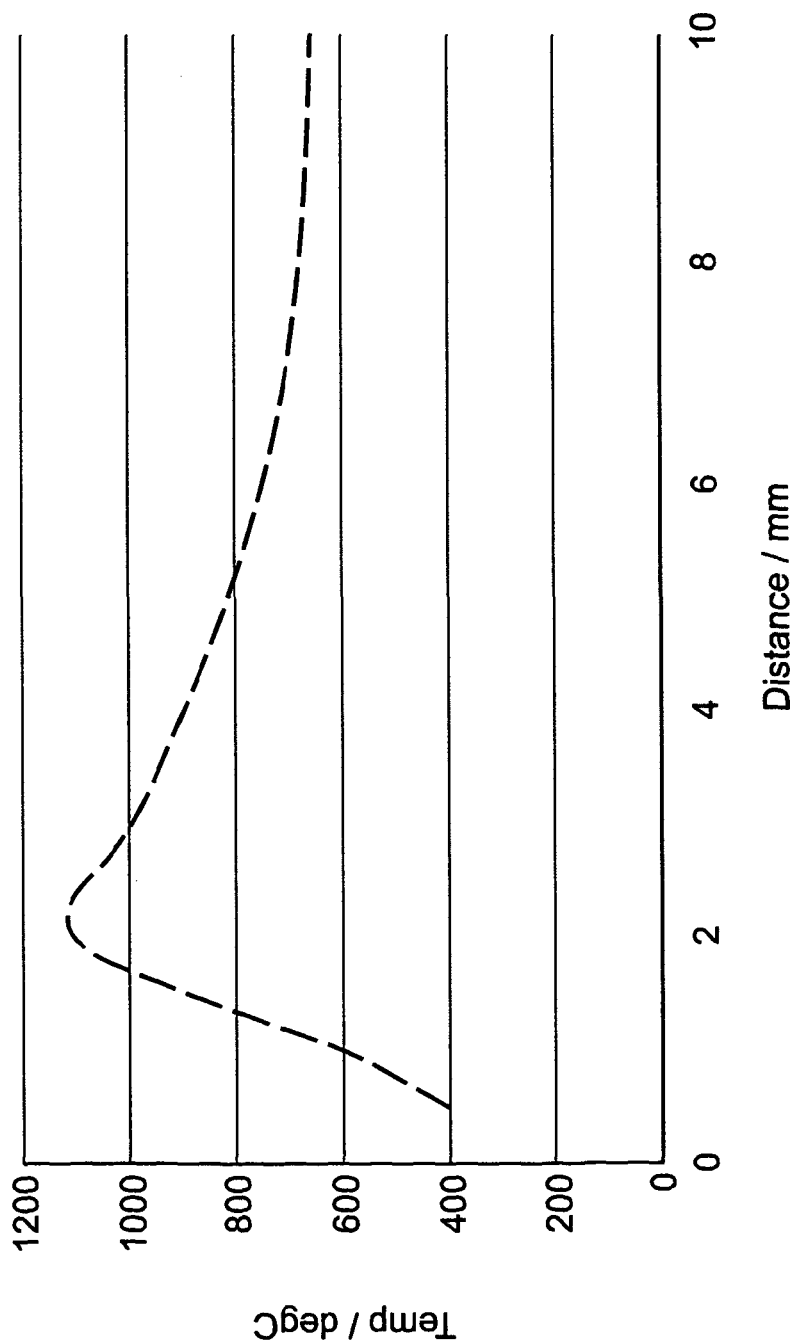
FIG. 1 is a representation of a thermal surface profile along a fixed bed of rhodium on alumina, during the partial oxidation of methane with oxygen according to the prior art.

FIG. 1 is a representation of a thermal surface profile through a fixed bed of rhodium on alumina, during the partial oxidation of methane with oxygen. The partial oxidation of methane is shown below:

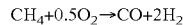

While there is the use of the inherently fast, rhodium catalysed partial oxidation of methane by oxygen that can result in a compact reactor desirable for the syngas process, the high temperatures encountered on the catalyst in the prior art processes preclude the use of the technology commercially. These types of prior art processes preclude any external heat transfer during the one-step reaction process. It is an object of the present invention to overcome this problem.

As indicated above the present invention relates to the use of a porous membrane sleeve for the partial oxidation of methane. This allows the use of a heat transfer surface located next to the porous membrane to reduce catalyst surface temperature. The use of a porous membrane for the contacting of methane and oxygen has previously been patented (WO 2004/001787 which is incorporated herein by reference) as it gives an advantageous method for production of synthesis gas. The separate introduction of the methane and oxygen gives a safer process and the use of a gas permeation layer controls the mixing of the two gases giving high conversions. This process has now been further developed in the present application by use of a heat transfer surface and geometries that enhance turbulence adjacent to the catalyst surface in the methane containing stream.

There are superficial similarities of a fixed bed of catalyst to a cylindrical porous support (i.e. catalyst) in that the cylinder could be viewed as a folded shallow fixed bed or a radial catalyst bed—however there are important differences. Firstly, reactant gases are introduced to both sides of the catalyst bed such that at least one reactant must diffuse to the reactive catalyst layer against the flow of the other reactant and product gases. Secondly, as the product gases are withdrawn down the length of a cylindrical membrane, across the surface of the catalyst bed, the composition of the gases varies from feed to product alongside the porous membrane. This results in a variation of the heat release characteristics along the membrane, even where a permeate control layer is applied to the membrane. Surprisingly, the effect is to produce a thermal profile along the membrane that is a modified version of the thermal profile through a fixed bed. Using geometries of reactor and catalyst that promote laminar flow the effect is most pronounced. Once the flow of the stream comprising methane and product synthesis gas becomes turbulent, the peak surface temperatures move past the mid-point of the reactor. Hence, the thermal profile can be affected by other features of the reactor that can result in a more even profile, for example promoting turbulence in the chamber containing the hydrocarbon feed gas which can eliminate the requirement of adding heat to parts of the catalyst zone. However, it still remains beneficial to moderate the catalyst surface temperature through the use of a heat transfer surface as surface overheating still occurs. Whereas within fixed bed systems the very shallow bed that is utilized prohibits the use of conventional heat exchange elements. The use of a long cylindrical contacting device extends the thermal profile which allows heat to be removed from the catalytic surface where the exothermic reaction is most intense and optionally heat added to the reaction where the endothermic reactions become more dominant.

Figure 2:
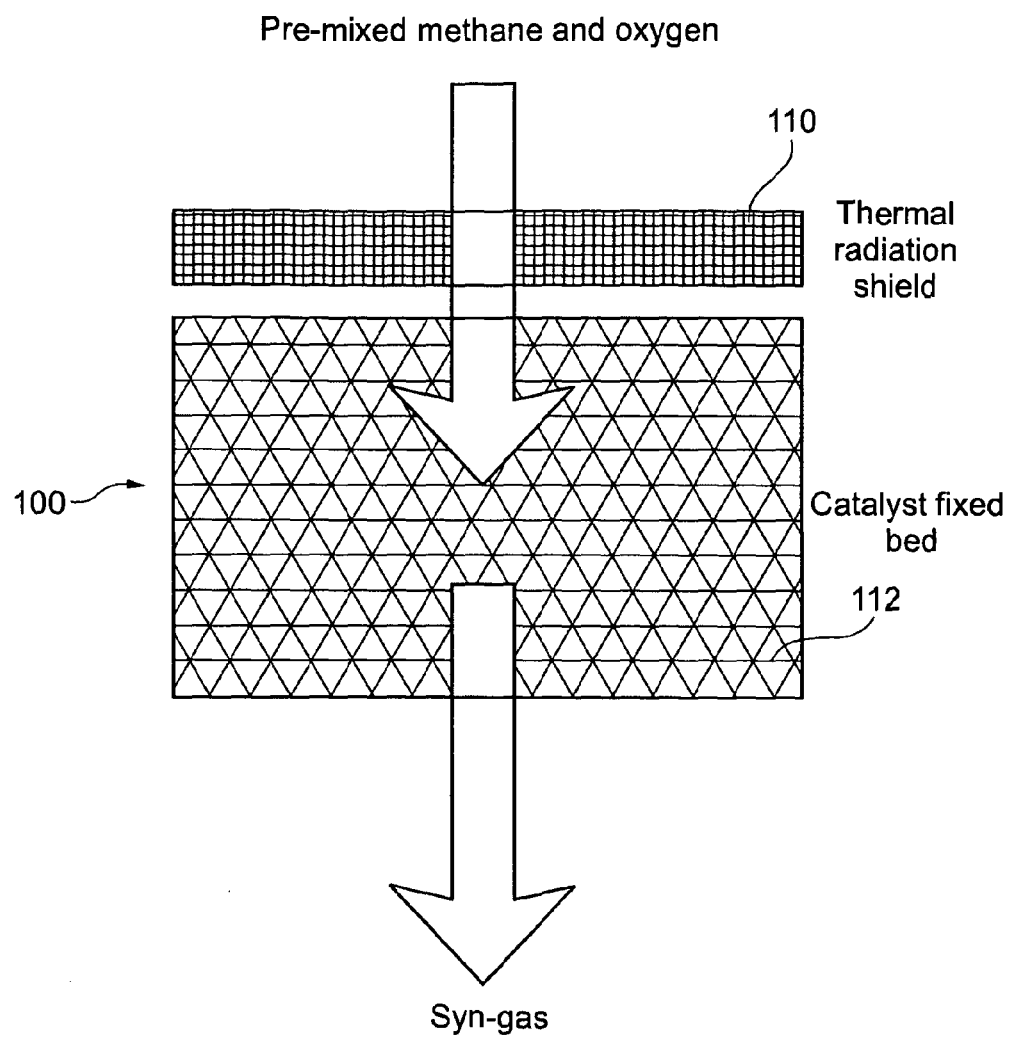
FIG. 2 is a representation of a fixed bed arrangement according to the prior art.

FIG. 2 is a representation of a fixed bed arrangement generally designated 100. As shown in FIG. 2 a pre-mixed mixture of methane and oxygen is initially fed into and through a thermal radiation shield 110. Loss of heat from the inlet side of the bed would result in the reaction failing to "ignite". The gas flow is then passed over a catalyst fixed bed 112 with the resulting mixture of methane and oxygen being converted to synthetic gas (i.e. syngas).

A limitation of the fixed bed process is that there is no simple mechanism by which surface temperature within the fixed bed can be reduced. Cooling the inlet gases results in the reaction being extinguished and reducing the selectivity of the reaction. Reduced selectivity results in more heat generation within the catalyst bed as the heat of reaction for the undesirable formation of carbon dioxide is much higher than the desirable partial oxidation reaction to carbon monoxide. The high gas velocities required for this type of fixed bed oxidation reactor results in a very shallow catalytic bed from which radiative heat cannot be removed from the surface. The present application addresses this problem.

Figure 3:
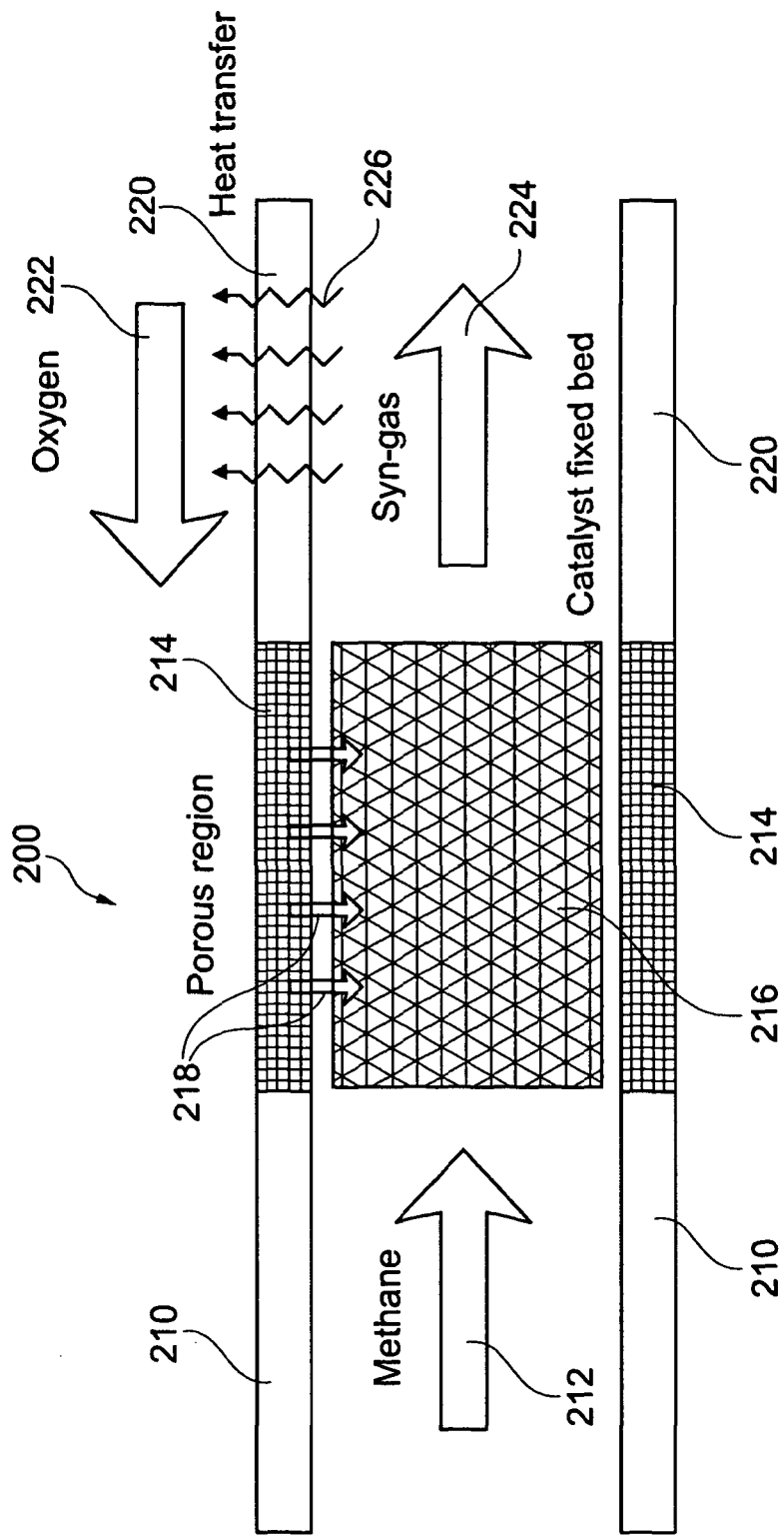
FIG. 3 is a representation of an apparatus which incorporates pre-heating of gases within a reactor shell according to the prior art.

Although providing a heat exchange surface within a reactor designed for partial oxidation of methane and containing is found in the prior art these types of systems transfer the heat from the product gases after the reaction zone to the incoming feed gases but do not allow for transfer of heat directly from the catalyst zone. Hence, this prior art process does not overcome the overheating of the catalyst that is inherent where the catalytic partial oxidation reaction operates in an adiabatic reaction zone. For example, we refer to FIG. 3 which represents an apparatus 200 which incorporates the pre-heating of gases within a reactor shell. The apparatus 200 represents a hybrid porous membrane reactor with a membrane acting as an oxygen distributor and pre-heating occurring for gases away from a reaction zone. FIG. 3 shows that there is an inlet feed 210 through which methane gas 212 is passed. The methane gas 212 is fed into a porous sleeve region 214 which contains a catalyst fixed bed 216. As shown in FIG. 3, oxygen 222 which is passed around the outside of the apparatus 200 permeates as shown by arrows 218 through the porous region 214 and into the catalyst fixed bed 216. The methane is converted to synthetic gas 224 in an outlet 220 with heat transfer occurring as shown by arrows 226 through the outlet 220. However, such processes do not overcome the overheating of the catalyst as the reaction zone is still operating adiabatically with no heat removal directly from the catalyst surface. The use of a porous membrane support as proposed in the present invention enables these higher temperatures to be managed.

FIGS. 4a to 4d represent how the catalytic surfaces and heat transfer surfaces may be arranged according to the present invention and in which zones it is possible to arrange for heat transfer to occur.

Figure 4A:
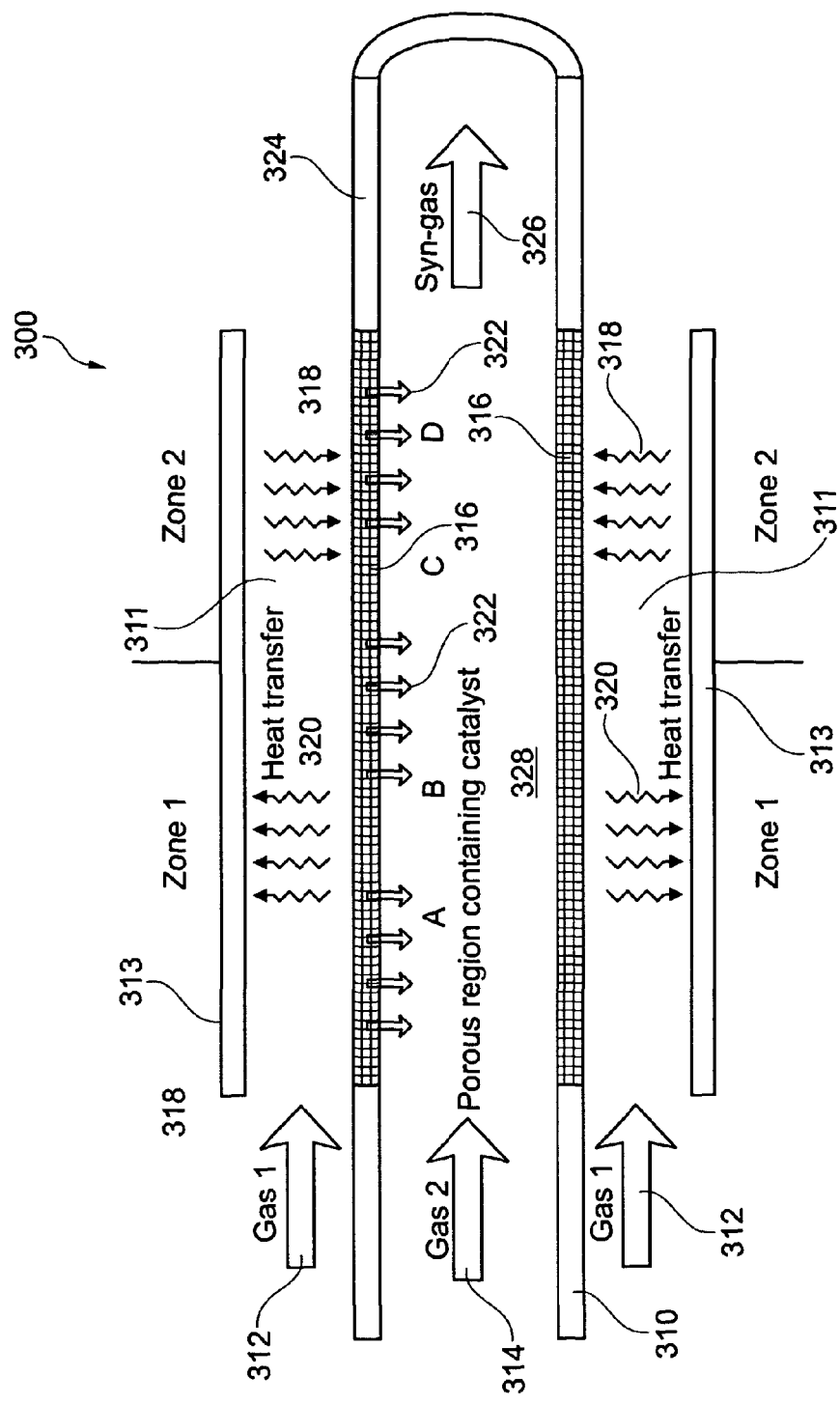
FIGS. 4a-4d are representations of apparatus suitable for the partial oxidation of methane according to an embodiment of the present invention.

FIG. 4a is a representation of an apparatus 300 according to the present invention. As shown in FIG. 4a, Gas 1 represented by reference numeral 312 is fed into a passageway 311 formed by an outer cylindrical sleeve 313. Gas 1 is fed at a rate of about 300 lpmin and may, for example, be oxygen. Gas 1 is pre-heated to a temperature of about 200° C. using any suitable type of pre-heater.

FIG. 4a also shows that Gas 2 represented by reference numeral 314 is fed via inlet 310 into a porous sleeve-type region 316 containing a catalyst. The porous sleeve-type region 316 may be of any suitable shape but must have a hollow core forming at least one passageway for Gas 2. For example, the sleeve-type region 316 may be cylindrical or substantially cylindrical in shape.

Gas 2 is fed at a rate of about 600 lpmin and may, for example, be methane. Gas 2 is pre-heated to a temperature of about 700° C. using any suitable type of pre-heater.

The porous sleeve-type region 316 is made from any suitable porous material (e.g. microporous) but particularly is made from an alumina based ceramic and has pore sizes of about 200-20,000 nm and may be comprised of composite layers. The material forming the porous sleeve-type region 316 has a thickness of about 3 mm.

FIG. 4a shows that once Gas 1 has entered into the passageway 311 formed by the outer sleeve 313, Gas 1 represented by arrows 318 is then able to permeate through the porous sleeve-type region 316 as shown by arrows 322 into a central passageway generally designated 328. This occurs in the region identified as Zone 1 and Zone 2 which has a temperature of about 700-1000° C.

Temperatures are typically hottest in Zone 1 depending on the amount of external gas preheating and the flow regime of the gases, laminar or turbulent. In the region of Zone 2 the temperatures typically fall below 900° C.

The distance between the outer sleeve 313 and the porous sleeve-type region 316 is about 20 mm. The outer sleeve 313 has a diameter of about 90 mm and a length of about 1900 mm. The porous sleeve-type region 316 has a diameter of about 50 mm and a total length of about 2000 mm. The active region of the porous sleeve-type region 316 where reaction occurs has a length of about 1900 mm.

The porous sleeve-type region 316 is made from any suitable porous material such as a sintered alumina based ceramic and contains any suitable type of catalyst such as dispersed rhodium metal. The catalyst is impregnated throughout the whole of the porous sleeve-type region 316 or is deposited on either or both of the inner and outer surfaces of the porous sleeve-type region 316.

The gases Gas 1 and Gas 2 predominantly contact within the porous region 316 where reactions occur. Diffusion of gases results in all gases being found to some extent in all regions. For example, in the embodiments where Gas 1 is oxygen and Gas 2 is methane, partial oxidation of the methane will occur as shown below:

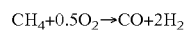

$$CH_4 + 0.5O_2 \rightarrow CO + 2H_2$$

The pressure in the central passageway 328 is about 400 Pa with a flow through production of syngas of about 1800 lpmin.

FIG. 4a also shows that there is heat transfer occurring as shown by the arrows 320 where heat is dissipated from the porous sleeve-type region 316 towards the outer sleeve 313. This process can occur because the surface temperature of the porous media is higher that the surrounding gases, a feature of methane partial oxidation with rhodium. The high temperature and high surface temperature allows heat to be removed by thermal radiation even to a surface that is above the temperature of the separating gas. In addition by extending the distance over which the characteristic surface temperature profile is seen it becomes possible only to remove heat from the mid-section of the bed where the surface temperatures are highest. The heat is dissipated by use of a cooler flowing gas across the reverse side heat transfer surface, additionally this gas may be in contact with a catalyst for an endothermic reaction such as steam reforming of methane above the surface 313. Moreover, where the reaction of the formation of the syngas becomes endothermic, heat may be added using an exothermic reaction.

As shown towards the right-hand side and in outlet 324 of FIG. 4a, Gas 1 and Gas 2 have been converted to a synthetic gas 326 (i.e. syngas).

In the reactor configuration according to FIG. 4a, a small non-commercial reactor containing a single catalytic membrane the catalyst surface 316 temperature can be controlled, for example, by zoned electronically controlled heating and cooling of the reactor wall 313 surrounding the porous catalytic membrane thereby creating an isothermal surface around the catalyst. For example, this may be achieved with a catalytic membrane that is typically 25 mm in diameter, 368 mm in length with a flow rate of methane in the region of 1 lpmin within a reactor of approximately 60 mm operating at 1 bara. The heat flux required to maintain this isothermal surface is shown in FIG. 5b. In section AB of the curve heat is being removed from the isothermal surface therefore cooling the surface (Zone 1 of FIG. 4a) and by heat transfer cooling the catalyst surface (section AB). In section BC of the curve heat is being provided to the isothermal wall (Zone 2 of FIG. 4a) and therefore the catalyst surface (area CD of the catalyst 316 in FIG. 4a) is being heated.

Modeling has shown that the use of an isothermal sleeve around the reaction zone, as indicated by surface 313 in FIG. 4a is able to reduce the peak surface temperature on the catalyst surface by about 100° C. Following on from this, the reduced catalyst surface temperature gives an increased life of catalyst. Alternatively, the feed temperatures of the gases can be increased which increases the conversion in the reactor and increases the thermal efficiency of the process.

Figure 5A:
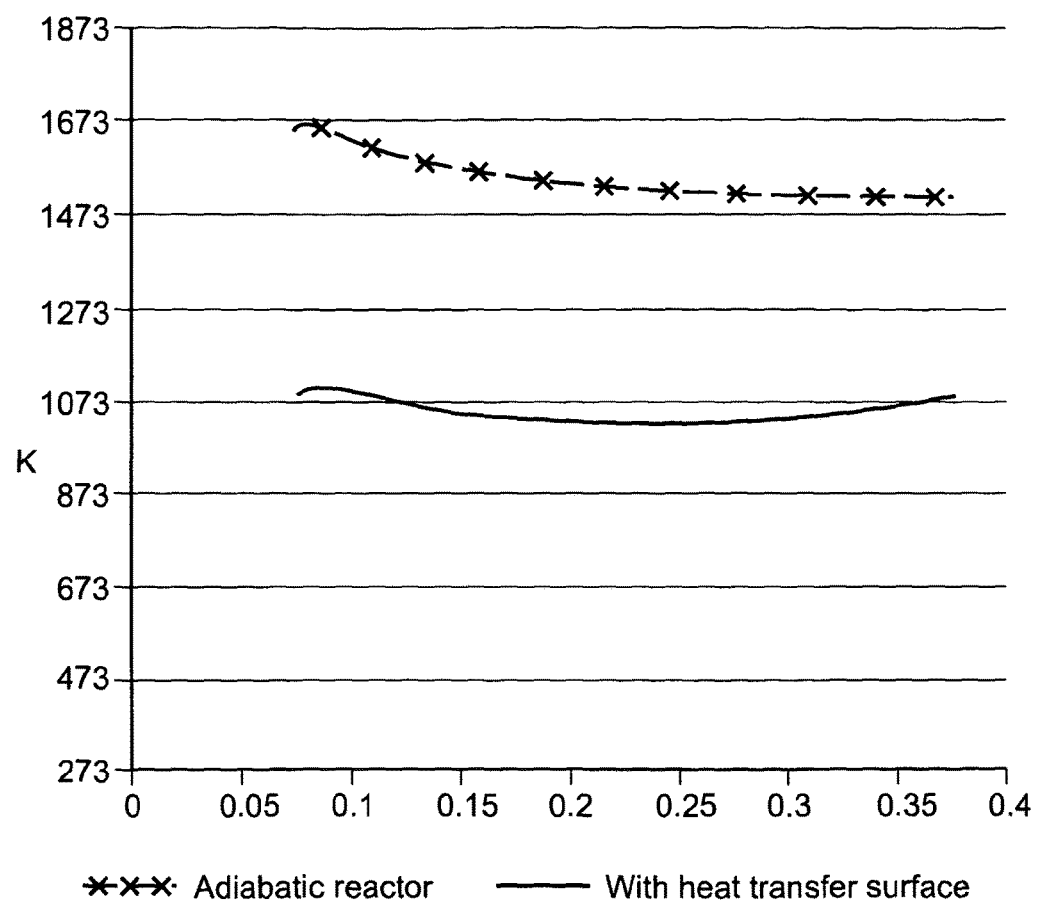
FIG. 5a compares the surface temperatures of the catalytic surface under adiabatic and isothermal conditions as determined by CFD modeling of the reactors operating with a laminar gas flow regime according to an embodiment of the present invention.
Figure 5B:
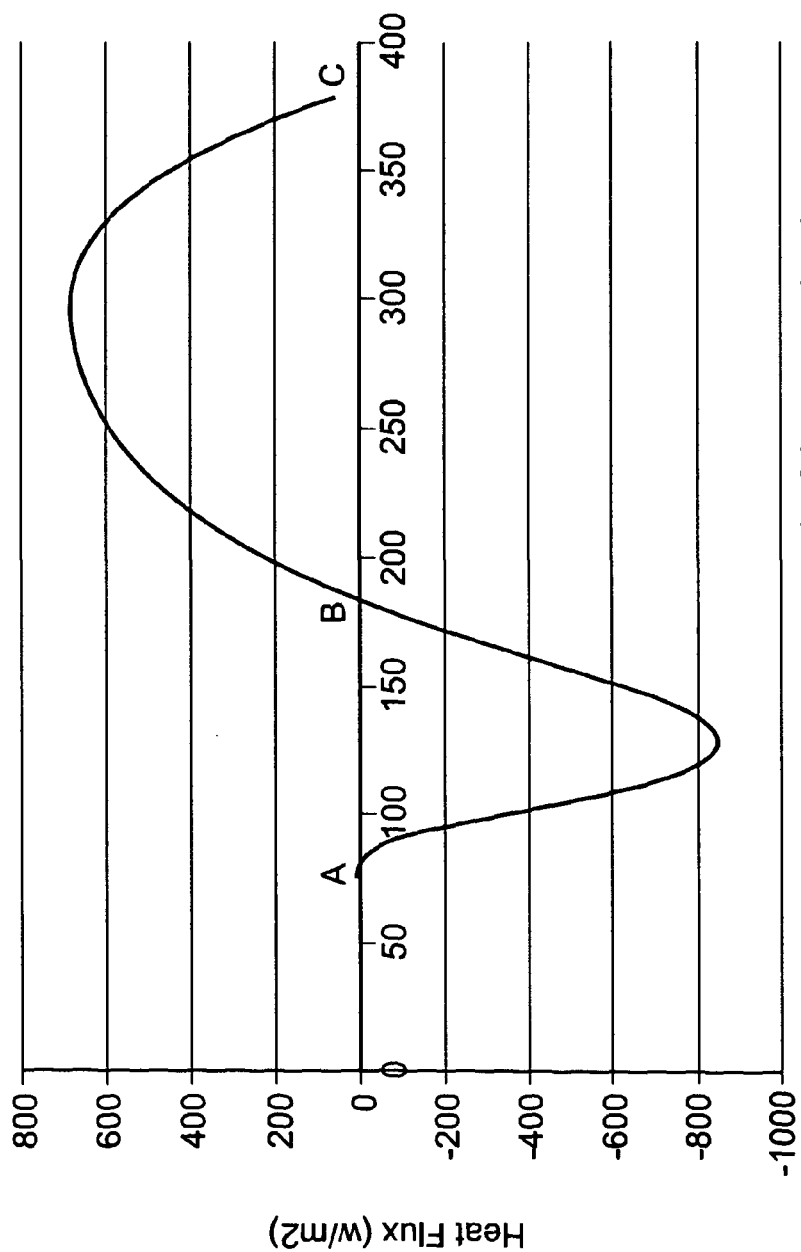
FIG. 5b illustrates the calculated heat flux from the heat transfer surface of a small reactor operating isothermally according to an embodiment of the present invention.

As a further example in FIG. 5a we see that calculated temperature profiles for the same small reactor operating in a laminar flow regime at 2 lpmin methane and 4 bara. The increased flow increases the amount of complete oxidation that takes place and consequently increases the exothermicity of the overall reaction. If the catalyst is operated with the reactor wall maintained isothermal at 800 deg C. (1073K) we see that the catalyst surface temperature shown on the graph is also near isothermal. If the reactor is operated adiabatically with no heat loss then the catalyst surface becomes excessively hot.

Figure 6:
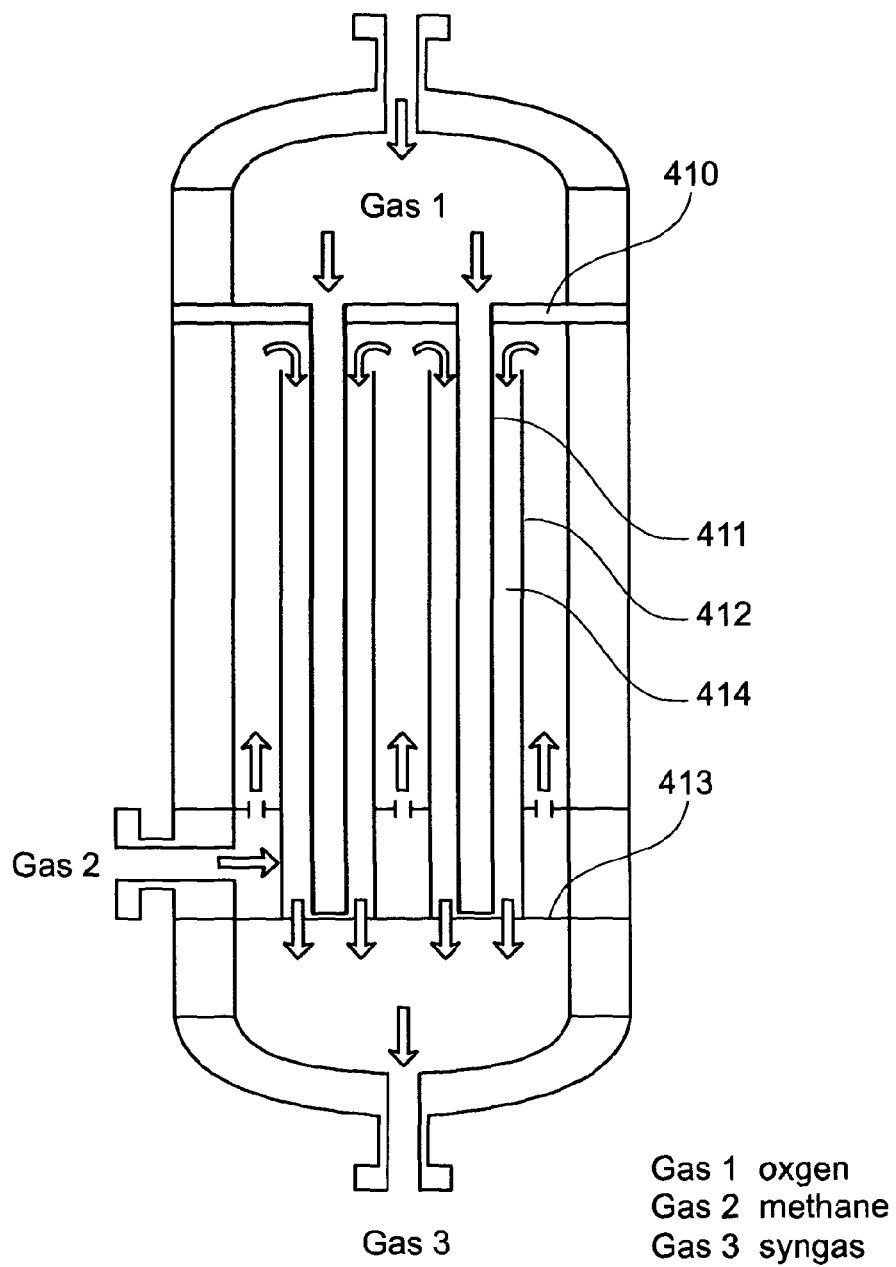
FIGS. 6 to 9 are representations of further arrangements of the present invention.
Figure 7:
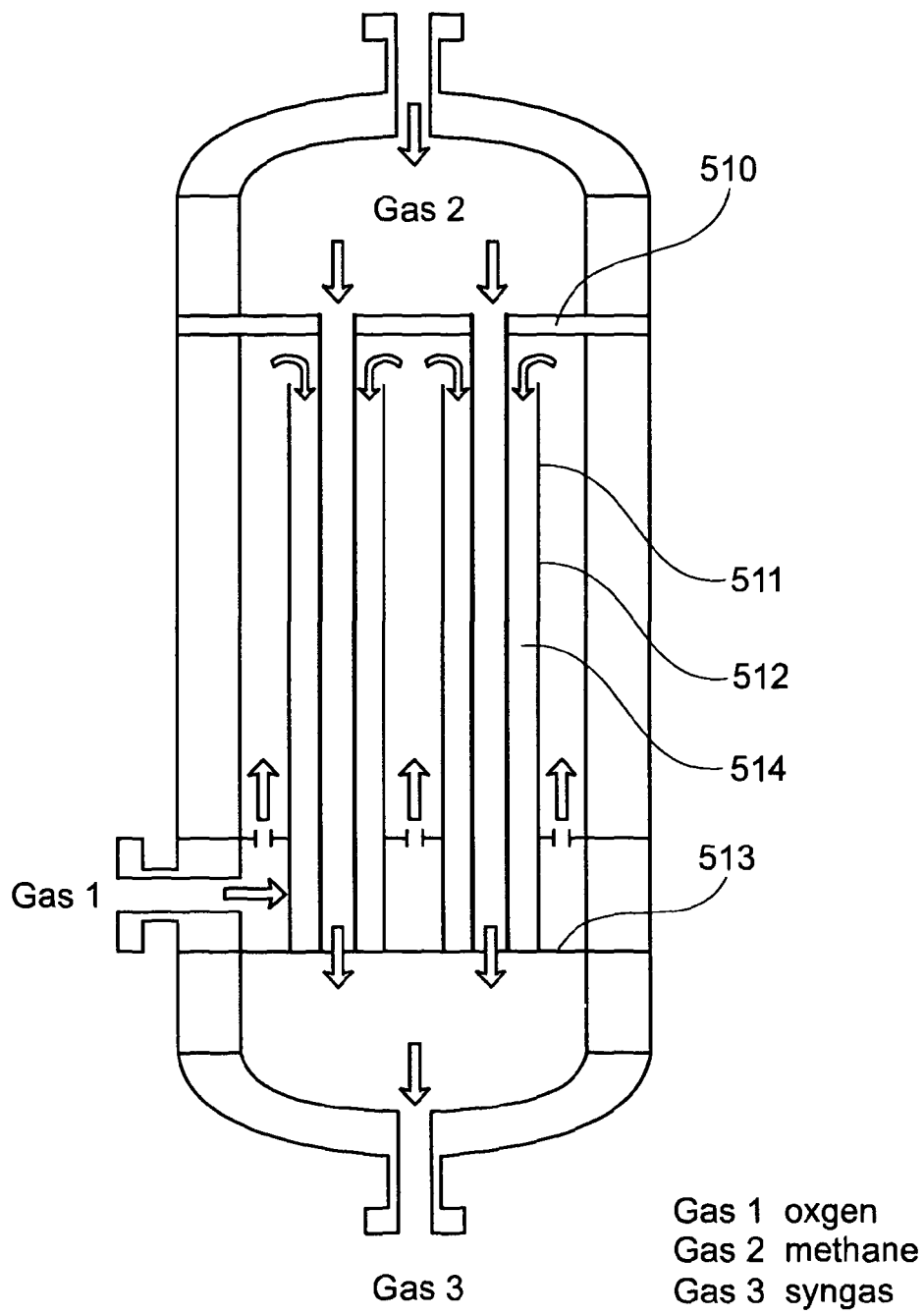

FIGS. 6 to 9 show several embodiments of how the reaction according to the present invention can be carried out in practice. These arrangements of heat transfer surface and catalyst surface can be incorporated into a reactor shell as shown in specific embodiments such as those shown in FIGS. 6 to 9. FIGS. 6 and 7 incorporate either pre-heating of Gas 1 or Gas 2. The designs could also incorporate heating of the other gas through the use of a bayonet tube within the cylindrical catalytic membrane body.

In a larger scale design of reactor it is found that if turbulent flow in the methane containing stream is promoted then a single heat removal zone is possible and Zone 2, shown in FIG. 4a may not be included for simplicity of reactor design. A multi-tube reactor design with heat transfer layout as shown in FIG. 4a is shown schematically in FIG. 7. In this reactor design the catalytic membrane 511 is sealed to both the upper tube sheet 510 and the lower tube sheet 513. This requires a sliding seal on the lower tube sheet 513 to avoid mechanical stresses on the catalytic membrane 511 as a result of differential thermal expansion. The heat transfer surface 512 pre-heats the incoming air before the air enters the outer chamber 514.

Alternate arrangements are possible which are discussed below.

Figure 4B:
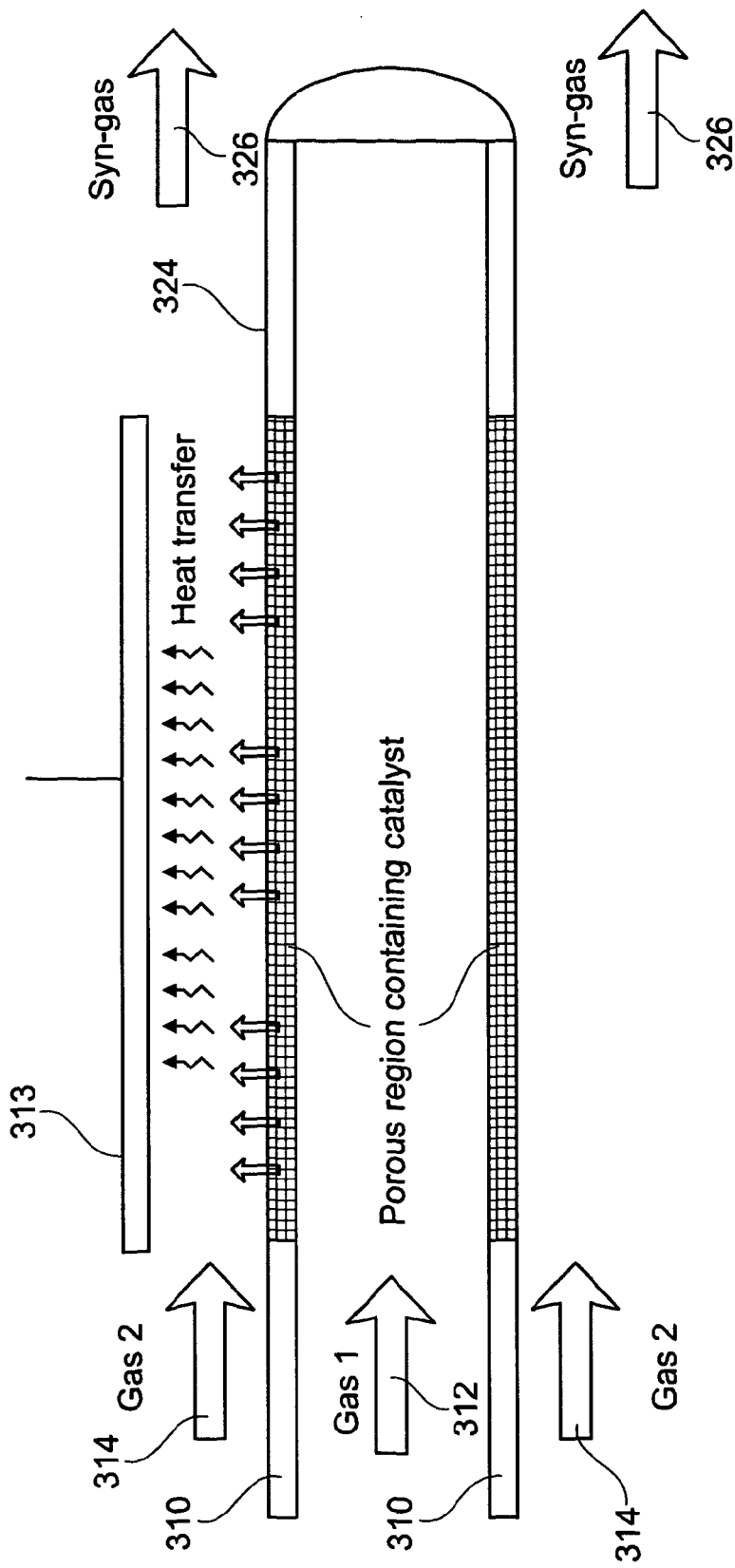

In FIG. 4b the arrangement of the gases is reversed with the oxygen containing gas passing down the centre of the catalytic porous membrane, this allows preheating of the methane containing gas within the shell of the reactor. Where the methane containing gas in the external area is turbulent, then the temperature profile may not have the strong exothermic peak near the beginning of the reactor. This arrangement has the benefit of only requiring a seal around one end of the catalytic membrane which can simplify the reactor design and reduce the cost.

Figure 4C:
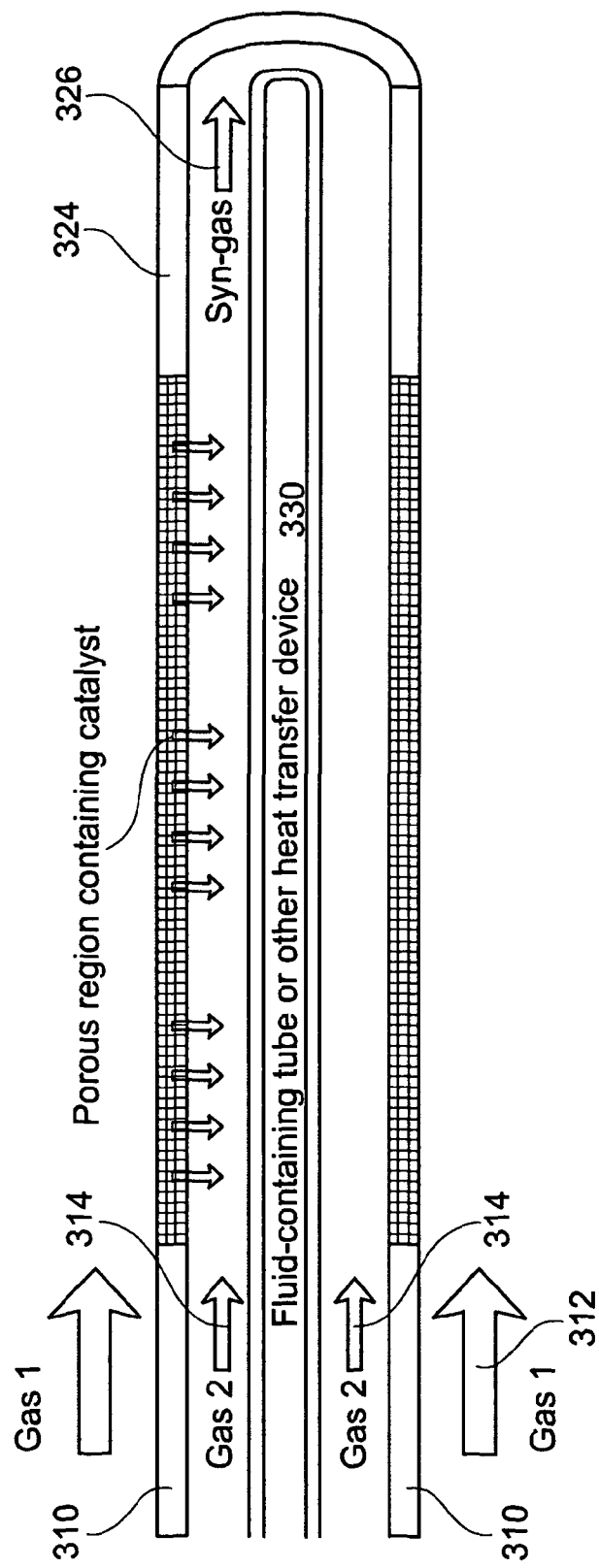
Figure 4D:
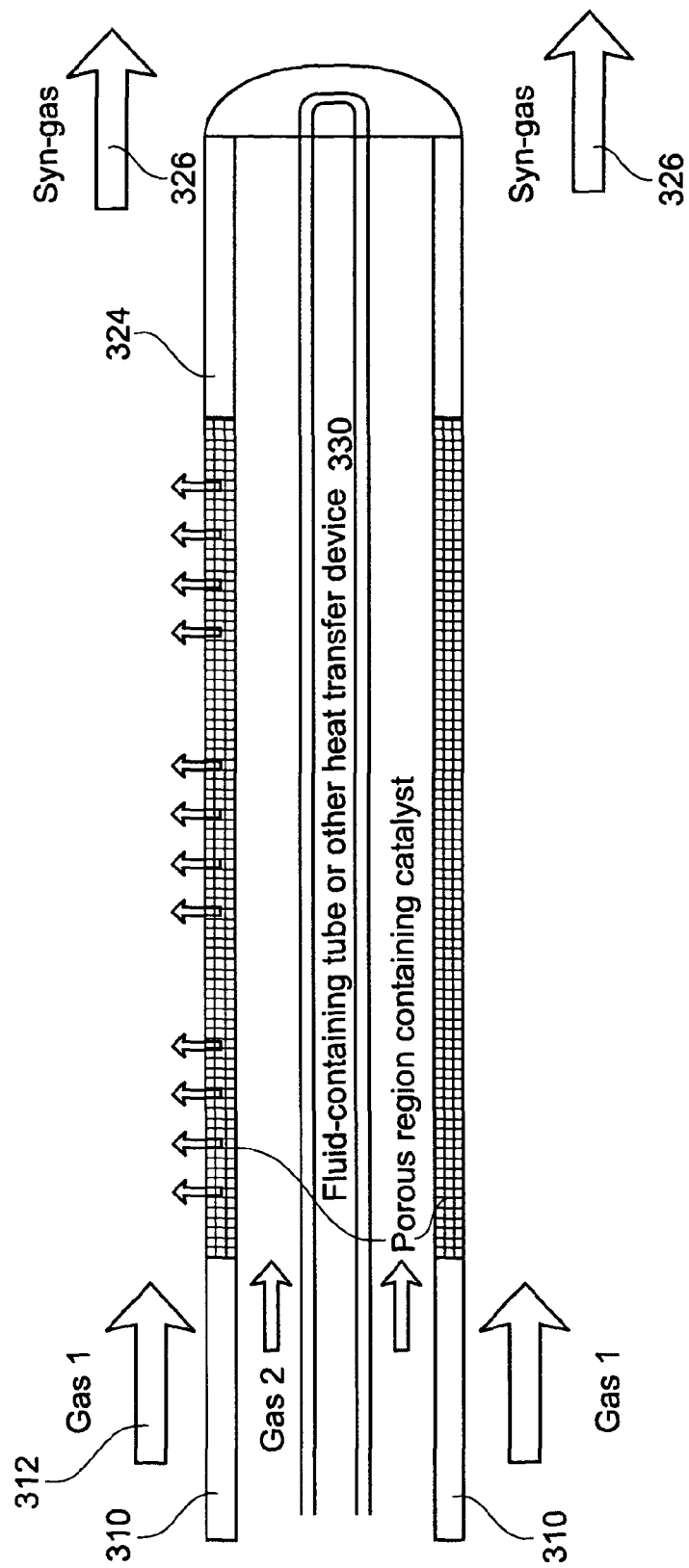

FIG. 6 shows how the arrangement of gases shown in FIG. 4b can be achieved for a multitube reactor. In the embodiment illustrated in FIG. 6 the catalytic membranes are formed from a porous alumina containing ceramic, circular in cross section with a single internal channel to maximize the internal hydraulic mean diameter. The diameter of the ceramic is approximately 41 mm and the length of the ceramic tube is around 3 meters. An additional porous element within the ceramic tube can be included to minimise the turbulence in the centre of the tube and distribute the oxygen containing gas down the tube. The oxygen containing gas is preheated to at least 200 deg C. and the methane containing gas is preheated to at least 400 deg C. The entire system operates at a pressure of approximately 10 bar with a differential pressure across the catalytic porous membrane of 1 bar or less. External to the catalytic tube there is a cylindrical metal sheath 412 that acts as the heat transfer surface and receives thermal radiation from the catalyst surface. The methane feed gas for the reactor passes along the outside of this tube in turbulent flow such that it picks up some heat from the surrounding sheath prior to entering the reaction chamber 414. Additional cold methane gas could also be introduced through a secondary distributor within the reactor shell to control the methane inlet temperature but is not shown in the diagram. This configuration requires no direct connection of the catalytic membrane 411 to the lower tube sheet 413 and so stresses on the catalytic membrane 411 are avoided. It is also possible to arrange the heat transfer surface so that it is located within porous catalytic membrane. These arrangements are illustrated in FIGS. 4c and 4d. The placing of the heat transfer surface within the centre of the catalytic structure has the benefit of allowing a highly compact design. However it may also promote laminar flow and reduce the available space for an oxygen porous distributor which can also be beneficial. The heat transfer device may take the form of a thermally conductive material as a means of removing excess heat out of the reaction zone or as a pipe for carrying a fluid.

Figure 8:
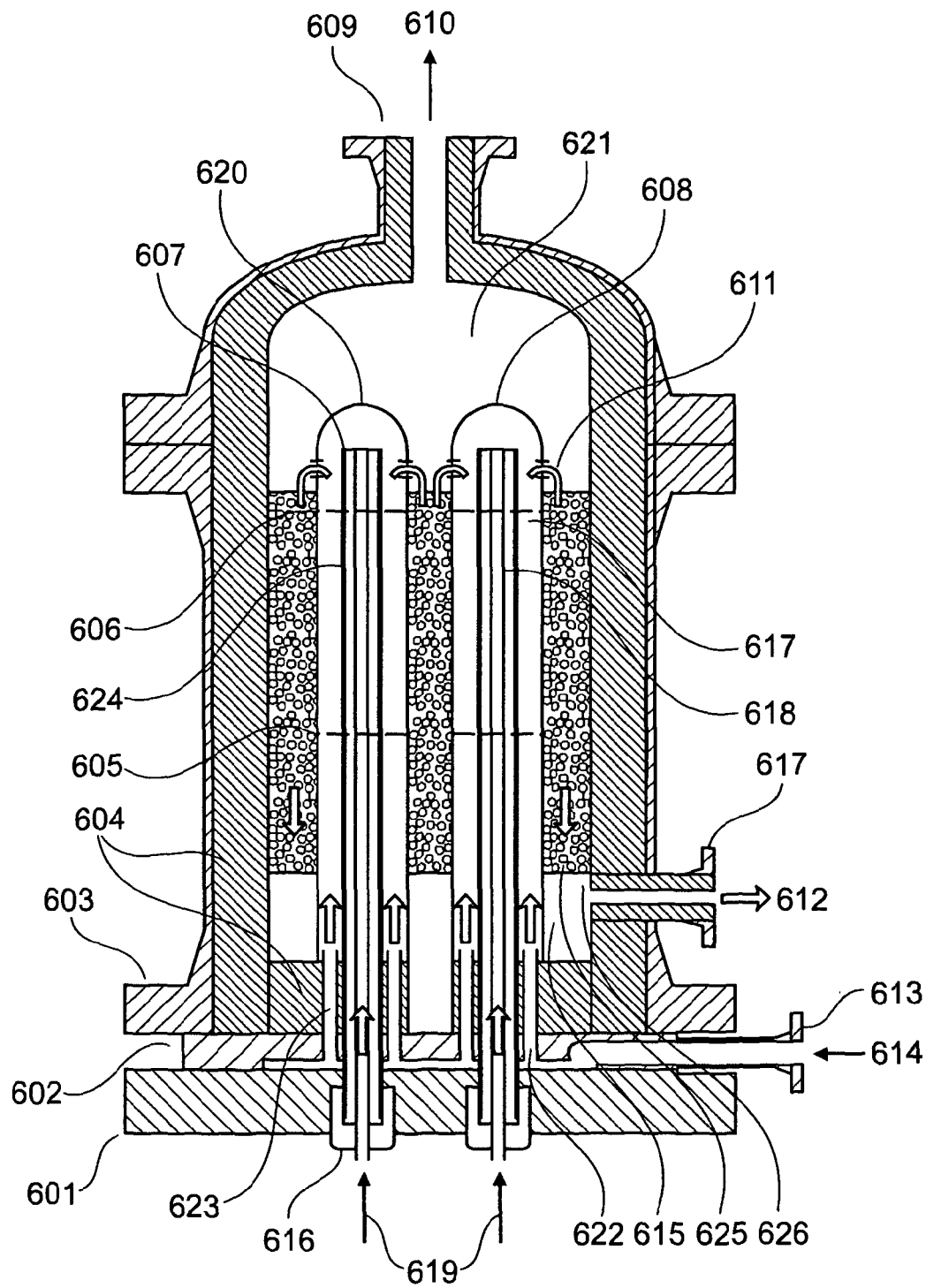
Figure 9:
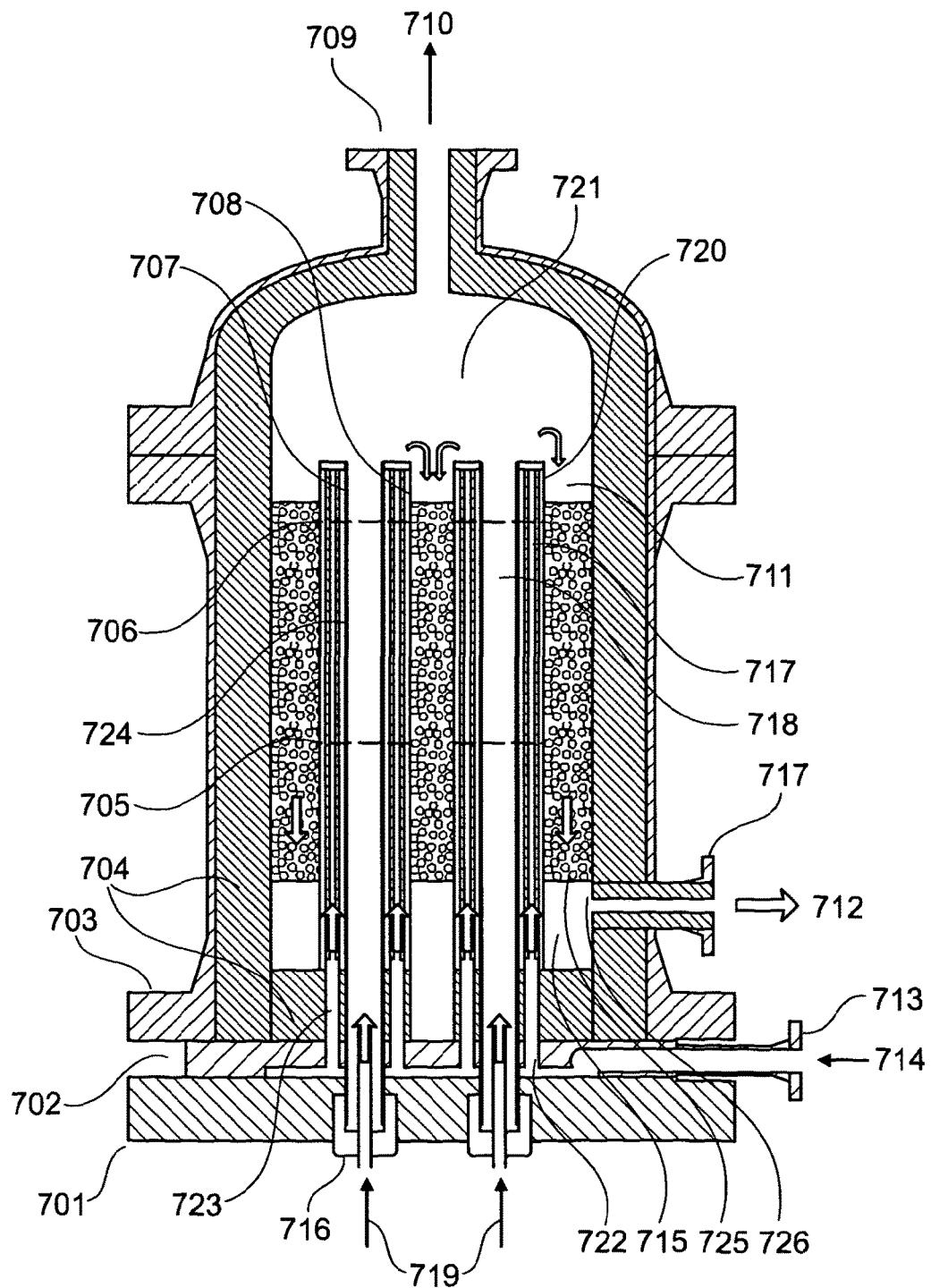

FIGS. 8 and 9 illustrate reactor embodiments that allow the coupling of the partial oxidation process using a two chamber device with a more conventional steam reforming catalyst. This allows reduction of the partial oxidation catalyst surface temperatures while minimizing the amount of oxygen required to achieve high conversion.

U.S. Pat. No. 4,844,837 Heck et al, teaches the use of a reactor combining the partial oxidation of methane using a catalyst containing a precious metal catalyst including optionally rhodium with the reactor beds positioned sequentially and utilising a premixed methane oxidant stream. U.S. Pat. No. 4,844,837 is incorporated herein by reference. As described in U.S. Pat. No. 4,844,837 the partial oxidation catalyst will suffer from deactivation as a result of high surface temperatures generated in the catalyst bed for the partial oxidation. A monolithic structured catalyst is proposed as a solution to mitigate the pressure drop that will result as a consequence of the high GHSV at which the partial oxidation catalyst operates.

One embodiment of the present invention that mitigates the high temperatures found as a result of the use of a monolithic catalyst is shown in FIG. 8.

In FIG. 8 oxidant gas 619 at a temperature from room temperature to 200 deg C. and a pressure of approximately 10 barg enters through one of the manifold sealing caps 616 and passes into a porous distributor 618 that conducts the oxidant gas into one of the partial oxidation chambers 620. The methane containing gas 614, preheated to a temperature of at least 400 deg C. is fed into nozzle 613 whereupon it enters into the distribution chamber 622. The distribution chamber 622 is protected from the higher temperatures of the main chamber through the use of a ceramic insulting lining 604. From the distribution chamber 622 the methane passes into the outer section of the partial oxidation chamber 620 through the distribution ports 623. These ports 623 optionally terminate with a device for maximising turbulence within the chamber 620 such as a swirl device, baffles or vanes (not shown). The chamber 620 will typically operate at a temperature of at least 800 deg C.

The catalytic membrane 624 consists of a thermally stable support within which a precious metal catalyst is deposited. Suitable catalysts may include those referred to in U.S. Pat. No. 4,844,837 and U.S. Pat. No. 7,641,888 Gobina, which are incorporated herein by reference. In one example the support consists of a stabilised alumina upon which a stabilised washcoat derived from gamma alumina is deposited to increase the surface area of the support. A rhodium salt such as rhodium chloride is deposited onto the support and reduced to form the rhodium metal.

The length and diameter of the catalytic membrane support 624 is chosen such that the Reynolds number of the fluid within the chamber 622 in which the methane is fed is greater than 500 and preferably greater than 2000 such that the fluid is turbulent within the distribution chamber 622. This has the effect of reducing surface temperatures of the catalyst as a result of reduced boundary layer thickness and improved mass transfer. Typically, the length of the ceramic membrane will be greater than 1 m and more typically 3 m with a diameter of greater than 10 mm and more typically in the region of 40-120 mm. The thickness of the membrane will be approximately 2-4 mm to provide sufficient mechanical strength both in operation and in manufacture.

The gas containing methane 619 and the oxidant gas 614 meet and react within the pores of the catalytic ceramic membrane 624. Some of the heat generated during the reaction is radiated to the walls 608 of the chamber 620 surrounding the catalytic membrane. The reaction of the methane and oxygen produces a syngas that may be rich in hydrogen and carbon monoxide but also contain some remaining methane and produced water and carbon dioxide. This gas 611 passes out of the chamber 620 and into a secondary reaction chamber 621 containing a catalyst 605 suitable for steam reforming such as those described elsewhere in the literature including U.S. Pat. No. 4,844,837, incorporated here by reference. The syngas containing excess methane and steam passes through the catalyst bed 605, to the chamber 626 below the catalyst support grid 624. As the syngas passes through the catalyst further reaction of methane and steam takes place to produce that further increases the conversion of methane through a steam reforming reaction. It is well known that the steam reforming reaction is an endothermic reaction and in this particular embodiment the heat for the reaction is provided by the heat of reaction from the partial oxidation and any complete oxidation that may also take place within the chamber 620. Introduction of a small amount of the oxidant through nozzle 610 and utilization of an oxidation resistance reforming catalyst in the upper section of the catalyst bed (606) may also be considered resulting in a heating zone and cooling zone as illustrated in FIG. 4a. The resultant syngas 612 exits the reactor through the nozzle 617.

In an alternate embodiment the identity of the location of the methane and oxidant flows are reversed. This is shown in FIG. 9. Methane gas 719 at a temperature preheated to typically 400 deg C. and at a pressure of approximately 10 barg enters through one of the manifold sealing caps 716 and passes into the centre of a the catalytic membrane 724 optionally through a device for maximising turbulence within the chamber 720 such as a swirl device, baffles or vanes (not shown). The oxygen containing gas 714, preheated to a temperature of from 25 to 200 deg C. is fed into nozzle 713 whereupon it enters into the distribution chamber 722. The distribution chamber 722 is protected from the higher temperatures of the main chamber through the use of a ceramic insulating lining 704. From the distribution chamber 722 the oxidant passes into the section of the partial oxidation chamber 720 through the distribution ports 723 and porous distributors 718 that distribute the oxygen down the tube, avoid creation of unnecessary turbulence in the oxidant stream. The chamber 720 will typically operate at a temperature of least 800 deg C.

The catalytic membrane 724 consists of a thermally stable support within which a precious metal catalyst is deposited. Suitable catalysts may include those referred to in U.S. Pat. No. 4,844,837 and U.S. Pat. No. 7,641,888 Gobina, incorporated herein by reference. In one example, the support consists of a stabilised alumina upon which a stabilised washcoat derived from gamma alumina is deposited to increase the surface area of the support. A rhodium salt such as rhodium chloride is deposited onto the support and reduced to form the rhodium metal.

The length, diameter and internal structure of the catalytic membrane support is chosen such that the Reynolds number of the fluid within the centre of the membrane in which the methane is fed is greater than 500 and preferably greater than 2000 such that the fluid is turbulent within the chamber 722. This has the effect of reducing surface temperatures of the catalyst as a result of reduced boundary layer thickness and improved mass transfer. Typically the length of the ceramic membrane will be greater than 1 m and more typically 3 m with a diameter of greater than 10 mm and more typically in the region of 40-120 mm. The thickness of the membrane will be approximately 2-4 mm to provide sufficient mechanical strength both in operation and in manufacture.

A suitable catalyst geometry has a sufficiently large channel down the centre of the membrane such that turbulence can be created. Multiple small channels promote laminar flow and reduce the effectiveness of the catalyst.

Figure 10A:
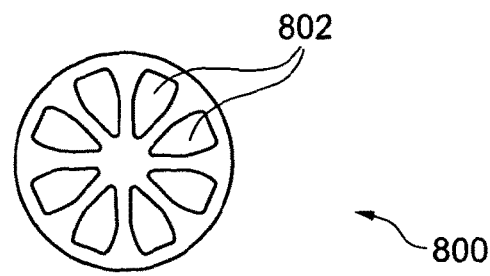
FIGS. 10a-10d represent catalytic membranes for generating turbulence in a porous membrane reactor according to embodiments of the present invention.

FIGS. 10a-10d represent catalytic membranes for generating turbulence in a porous membrane reactor as previously described. FIG. 10a represents a membrane 800 made from ceramic with a diameter of about 25 mm. The membrane 800 has a series of outer located channels 802. This membrane configuration is only suitable for use with a reactor configuration as shown in FIG. 8 in which the oxygen containing stream passes down the channels 802 and the methane containing stream passes along the external surface of the membrane 800 but precludes the use of an oxygen distributor. The channels 802 are too small for turbulence to develop internally without causing a large pressure drop.

Figure 10B:
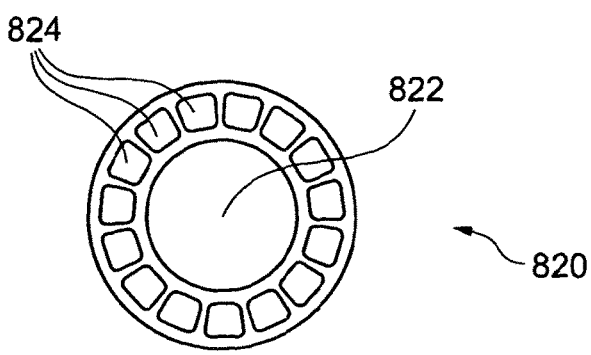

FIG. 10b represents a membrane 820 which has a central channel 822 and a series of outer located channels 824. The central channel 822 has a large enough diameter to be used in either reactor configuration. In the configuration shown in FIG. 8 an internal oxygen distributor can be fitted or in configuration shown in FIG. 9 in which the methane flow passes through the central channel 822 turbulent methane flow can develop.

Figure 10C:
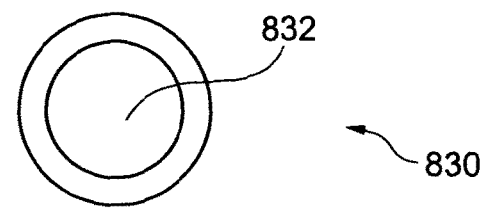

FIG. 10c represents a membrane 130 with a simple large channel 832 which is similar in design and use as the configuration FIG. 10b. In the configuration shown in FIG. 10c thicker wall is utilised to enable a stable extrusion, whereas in FIG. 10b the extrusion is made more stable through the use of a lighter but more complex and larger volume structure.

Figure 10D:
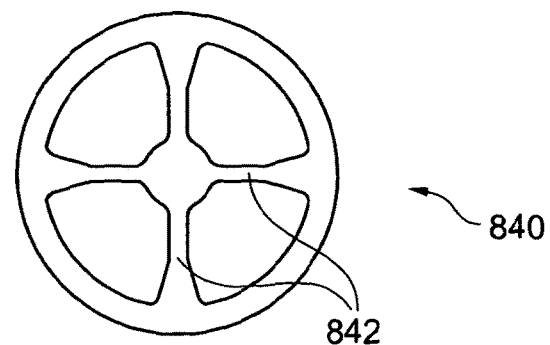

FIG. 10d is a further membrane 840 where the number of spokes 842 has been minimised to achieve a balance between the hydraulic mean diameter of channels 844 and stability of the ceramic in the extrusion process. The structure would typically have an external diameter in excess of 50 mm and with individual channels 844 having hydraulic mean diameters in excess of 25 mm. This structure is most suitable for use in reactor configuration FIG. 9 in which the methane passes down the centre channels and no internal oxygen distributor is required.

Other configurations of the present invention are possible such as those discussed below.

Figure 11:
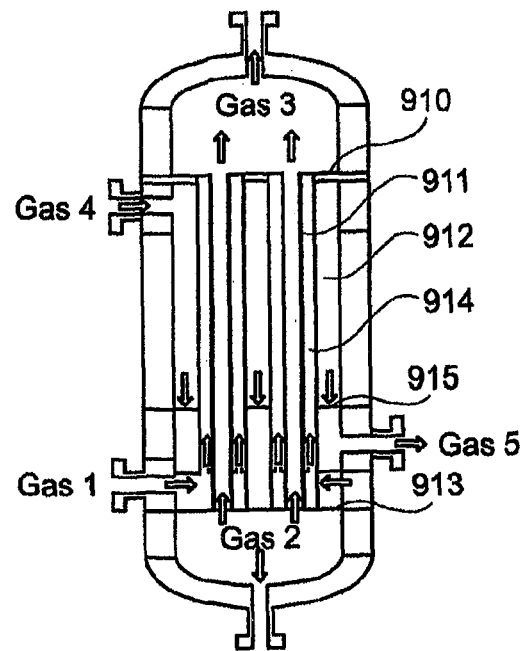
FIGS. 11 and 12 are representations of further apparatus according to the present invention.

In FIG. 11, which is a variation on the arrangement FIG. 7 the heat transfer tube 912 is sealed to both the upper tube sheet 910 and lower tube sheet 913 creating a separate pressure chamber 915 surrounding the catalytic membrane 911. A heat transfer fluid passes through the chamber 915 and is used to remove heat, A suitable fluid would be steam or nitrogen or other thermally stable gas that can be utilised elsewhere in the process. Gas 1 is oxygen, gas 2 is methane, gas 3 is syngas. This has the benefit in allowing the excess heat to be integrated into other process units. The negative aspect is that the high temperatures involved present sealing and thermal stress challenges.

Figure 12:
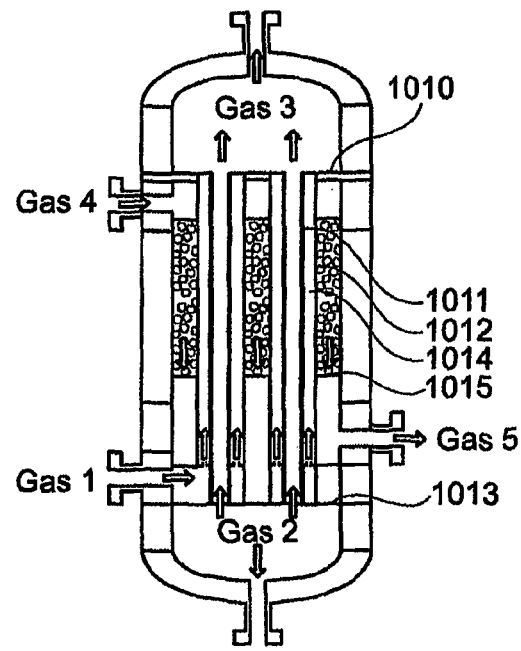

In FIG. 12 a catalyst 1015 is incorporated into the design, as with FIGS. 8 and 9, but reactions other than steam reforming can now be accommodated that are compatible with the reaction temperatures and pressure but the flow rates are now independent from the main reaction flows. The heat transfer tube 1012 is sealed to both the upper tube sheet 1010 and lower tube sheet 1013 creating a separate pressure chamber 1015 surrounding the catalytic membrane 1011. A third reactant passes through the chamber 1015 and is used to remove heat through an endothermic reaction. Examples of reactions that may occur could be dry reforming where the gas 4 contains carbon dioxide, methane and hydrogen resulting in a syngas composition, gas 5, with reduced methane content. Alternatively, gas 4 could be part or all of the hydrocarbon and steam to be fed to the partial oxidation process whereupon a pre-reforming reaction could take place within the catalyst bed utilizing heat from the partial oxidation reaction to react some of the hydrocarbons present into carbon monoxide and hydrogen therefore reducing the amount of oxygen required in the overall process.

Whilst specific embodiments of the present invention have been described above, it will be appreciated that departures from the described embodiments may still fall within the scope of the present invention. For example, any suitable type of porous support catalyst may be used.

The invention claimed is:

1. An apparatus for the oxidation of reactant gases, said apparatus comprising:
   a first chamber forming a passageway for a first reactant gas;
   a second chamber forming a passageway for a second reactant gas;
   a porous catalytic membrane separating the first and second chambers, said porous catalytic membrane adapted to allow all of the first reactant gas to permeate from the first chamber through the porous catalytic membrane to the second chamber and the second reactant gas to diffuse into the porous catalytic membrane such that there is a reaction producing products which pass through at least a portion of the porous catalytic membrane into the second chamber;
   wherein the apparatus is configured such that a heat of reaction from the reaction of the first and second reactant gases is transferred from at least a portion of the reaction zone; and
   wherein a heat exchange transfer surface is configured to transfer heat away from the catalytic surface under substantially exothermic reaction conditions and configured to transfer heat to the reaction under substantially endothermic reaction conditions.

2. The apparatus according to claim 1, which is capable of pre-heating gases by a coupling of the apparatus to an endothermic reaction such as steam reforming of methane, the reaction zone in the second chamber where the first and second reactant gases react is directly connected to an endothermic reaction, and wherein the reaction zone in the second chamber where the first and second reactant gases react is directly connected to an exothermic reaction.

3. The apparatus according to claim 1, which is capable of maintaining the reaction zone at a temperature about 950° C. by using externally connected exothermic and/or endothermic reactions, wherein the reaction zone has a length of about or greater than 100 cm and has a maximum surface temperature of 1050° C., wherein at least one of the first and second reactant gases are Pre-heated in the region of the reaction zone in the apparatus to a temperature of about 600° C., wherein the flow rate of the first and second reactant gases is about or greater than 100 lpmin and 50 lpmin, respectively per chamber.

4. The apparatus according to claim 1, wherein the first chamber is in the form of a sleeve such as cylindrical in shape, wherein the first chamber has a central passageway through which the first reactant gas flows through, and wherein the first chamber also forms a reaction chamber in which the first and second reactant gases react in the reaction zone.

5. The apparatus according to claim 1, wherein the second chamber is in the form of a sleeve such as cylindrical in shape, the second chamber has a larger diameter than the first chamber and therefore forms an outer sleeve around the first chamber.

6. The apparatus according to claim 1, wherein the first chamber has a larger diameter than the second chamber and therefore forms an outer sleeve around the second chamber.

7. The apparatus according to claim 1, wherein the apparatus is configured such that the first reactant gas permeates from the first chamber through the porous catalytic membrane at high temperatures into the second chamber to react with the second reactant gas, the first reactant gas is oxygen,
   wherein the apparatus comprises a heat exchange surface adapted to preheat the first reactant gas to a temperature of about 200° C., and
   wherein the porous catalytic membrane forms a porous sleeve-type region containing a catalyst, and wherein the apparatus comprises a heat exchange surface adapted to preheat the second reactant gas to a temperature of.

8. The apparatus according to claim 1, wherein the reactor is configured to allow the first and second reactant gases to react to form a synthetic gas by means of a reaction between the first and second reactant gases react to form the synthetic gas as follows:

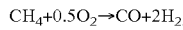

9. The apparatus according to claim 1, wherein the porous catalytic membrane substantially comprises alumina and has pore sizes of about 6 μm,
wherein the apparatus further comprises a heat exchange surface which is adapted to maintain a temperature of about 850° C. and maintain a catalyst surface temperature of about 950° C.,
wherein said apparatus is adapted to allow a combination of exothermic and/or endothermic reactions and has a heat transfer means which is adapted to maintain the catalyst at an operating temperature of about 950° C.,
wherein said heat exchange transfer surface is adapted to remove heat from the catalytic surface when reaction conditions are exothermic and adapted to add heat to the reaction when the reaction conditions are endothermic,
wherein said heat exchange transfer surface is adapted to remove heat from the catalytic surface by means of the endothermic reaction of steam reforming of methane,
wherein said apparatus is configured such that a first reactant gas and second reactant gas can react in a channel surrounded by a porous catalytic reaction zone in which the length and diameter of the channel is chosen such that the Reynolds number generated by the channel the first reactant gas and the second reactant gas is greater than 500, and
wherein the second chamber has a length and diameter such that the Reynolds number of the second reactant gas passing along the porous catalytic membrane has a Reynolds number greater than about 500.

10. The apparatus according to claim 1, wherein the channel is configured to generate a Reynolds number in the second chamber ranges from about 500 to 20,000.

11. The apparatus according to claim 1, wherein the apparatus is configured such that oxygen is fed to the apparatus through a porous zone that is separate from the porous catalyst containing zone where:
the apparatus is adapted to maintain the Reynolds number in the chamber comprising oxygen is lower than in the channel comprising methane;
wherein the oxygen porous distributor is open ended;
wherein a fraction of the gas is allowed to pass from one chamber to another without passage through the catalytic membrane;
wherein the apparatus is refractory lined with at least one of ceramic, glass refractory lining, or refractory lining covered with a protective metal sheath, a nickel-iron-chromium alloy, or Incoloy® 800HT (Special Metals Corporation, 4317 Middle Settlement Road, New Hartford, N.Y. 13413, USA; (315) 798-2900);
wherein the apparatus comprises a reactor having a shell which has an internal refractory material adapted to self-contain heat giving the reactor adiabatic features that will allow the recovery of heat after passing through the reactor wherein the energy from the hot gases can then be used to generate energy or pre heat gases at the beginning, and
wherein said refractory lining is also capable of recovering heat from the reactor and having a configuration adapted to generate energy or pre-heat gases entering the reactor.

12. An apparatus for the oxidation of reactant gases, said apparatus comprising:
a first chamber forming a passageway for a first reactant gas;
a second chamber forming a passageway for a second reactant gas;
a porous catalytic membrane separating the first and second chambers, said porous catalytic membrane allowing the first reactant gas to permeate from the first chamber through said porous catalytic membrane to the second chamber and the second reactant gas to diffuse into the porous catalytic membrane such that there is reaction producing products which pass through at least a portion of the porous catalytic membrane into the second chamber as a products gas;
said products gas comprising one or more of said first reactant gas, said second reactant gas and said products;
wherein the apparatus is configured such that a heat of reaction from the reaction of the first and second reactant gases is capable of being transferred from at least a portion of the reaction zone by passage of the first reactant gas along at least a portion of a heat transfer surface which is substantially perpendicular to a direction of flow of at least one of said first reactant gas and said second reactant gas through the porous catalytic zone.

13. A method of transferring heat from a reaction zone of an apparatus used for the oxidation of reactant gases, said method comprising:
providing a first chamber forming a passageway for a first reactant gas;
providing a second chamber forming a passageway for a second reactant gas;
providing a porous catalytic membrane separating the first chamber and the second chamber, said porous catalytic membrane being capable of allowing the first reactant gas to permeate from the first chamber through the porous catalytic membrane to the second chamber and the second reactant gas to diffuse into the porous catalytic membrane such that there is reaction producing products which pass through at least a portion of the porous catalytic membrane into the second chamber as a products gas;
said products gas comprising one or more of said first reactant gas, said second reactant gas and said products;
wherein the heat of reaction formed from the reaction of the first and second reactant gases is transferred from at least a portion of the reaction zone by passage of the products gas along a heat transfer surface which is substantially perpendicular to the direction of flow of said first reactant gas and said second reactant gas through the porous catalyst zone;
wherein the apparatus is configured to achieve a required Reynolds number in a second chamber gas flow, the length of the second chamber is longer than 400 mm; and wherein to obtain the required Reynolds number in the second chamber gas flow, the hydraulic mean diameter of the second chamber is greater than 5 mm; and
wherein a heat exchange transfer surface is configured to transfer heat away from the catalytic surface under substantially exothermic reaction conditions and configured to transfer heat to the reaction under substantially endothermic reaction conditions.

* * * * *